(12) United States Patent
Maeda et al.

(10) Patent No.: US 9,141,244 B2
(45) Date of Patent: Sep. 22, 2015

(54) TOUCH PANEL AND DISPLAY DEVICE PROVIDED WITH SAME

(75) Inventors: Kazuhiro Maeda, Osaka (JP); Yousuke Nakagawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 109 days.

(21) Appl. No.: 14/110,766

(22) PCT Filed: Apr. 9, 2012

(86) PCT No.: PCT/JP2012/059698
§ 371 (c)(1),
(2), (4) Date: Oct. 9, 2013

(87) PCT Pub. No.: WO2012/141139
PCT Pub. Date: Oct. 18, 2012

(65) Prior Publication Data
US 2014/0028626 A1   Jan. 30, 2014

(30) Foreign Application Priority Data

Apr. 13, 2011 (JP) .................. 2011-089460

(51) Int. Cl.
*G06F 3/044* (2006.01)
*G06F 3/041* (2006.01)
(52) U.S. Cl.
CPC .............. *G06F 3/044* (2013.01); *G06F 3/0416* (2013.01); *G06F 2203/04111* (2013.01); *G06F 2203/04112* (2013.01)

(58) Field of Classification Search
CPC .................. G06F 3/044; G06F 3/0416; G06F 2203/04111; G06F 3/0412; G09G 2300/0426
USPC ...................... 345/173, 178; 178/18.03, 16.06
See application file for complete search history.

(56) References Cited

U.S. PATENT DOCUMENTS

| 2008/0266273 A1* | 10/2008 | Slobodin et al. ............... 345/174 |
| 2009/0315854 A1* | 12/2009 | Matsuo .......................... 345/174 |
| 2010/0045613 A1* | 2/2010 | Wu et al. ........................ 345/173 |
| 2010/0066692 A1 | 3/2010 | Noguchi et al. |
| 2011/0095991 A1* | 4/2011 | Philipp et al. ................. 345/173 |

FOREIGN PATENT DOCUMENTS

JP     2010-72743 A     4/2010

OTHER PUBLICATIONS

U.S. Appl. No. 14/110,760, filed Oct. 9, 2013.

* cited by examiner

*Primary Examiner* — Koosha Sharifi-Tafreshi
(74) *Attorney, Agent, or Firm* — Chen Yoshimura LLP

(57) ABSTRACT

The touch panel (1*a*) of the present invention includes a plurality of driver electrodes (2), a plurality of detection electrodes (3) that extend in the column direction, and a complementary electrode (4), which extends in the direction in which the driver electrodes extend, and which forms a parasitic capacitance that corresponds to capacitance components that are not affected during detection of an object to be detected that comes into contact with or approaches the detection surface among the parasitic capacitances formed in the gaps between the driver electrodes (2) and the detection electrodes (3), in the gap from the detection electrodes (3).

14 Claims, 31 Drawing Sheets

FIG. 1
(a)
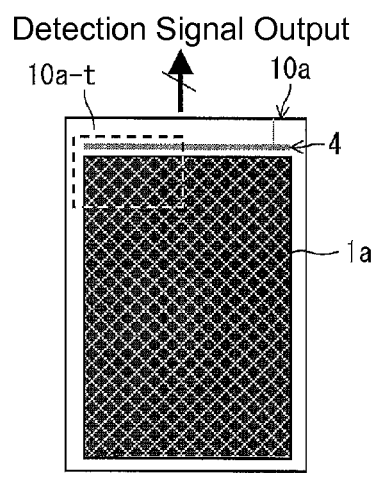
(b)
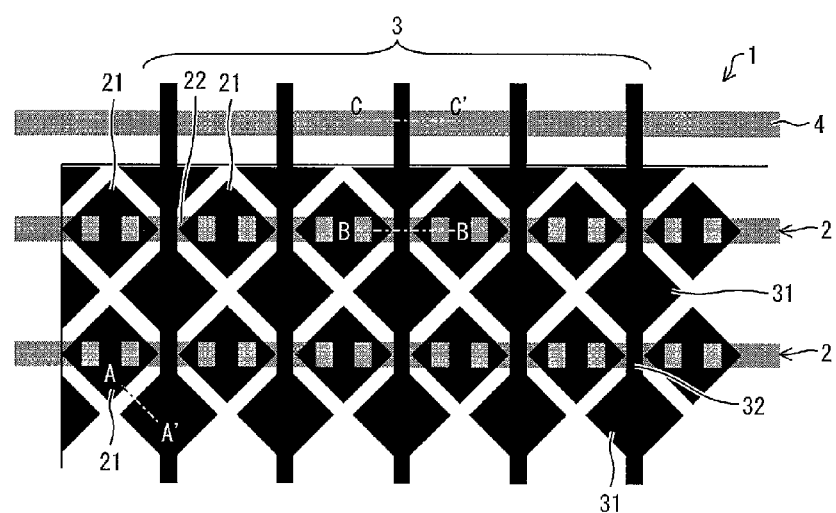
(c)
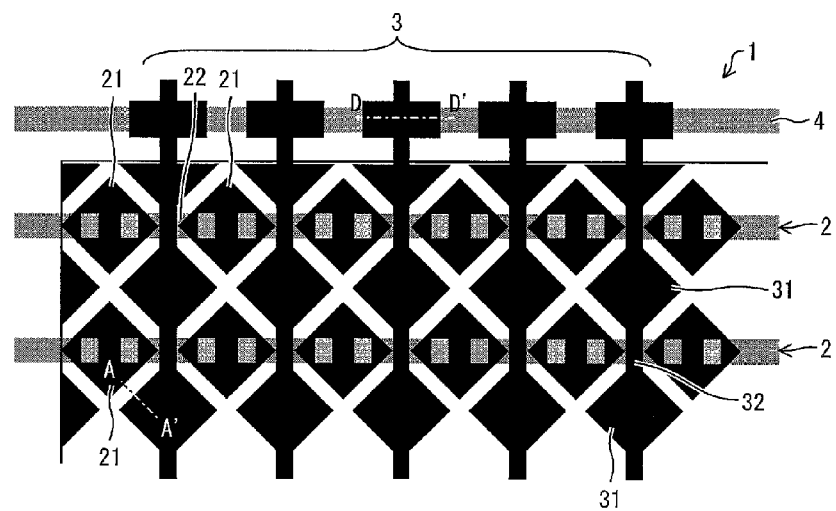

FIG. 2
(a)
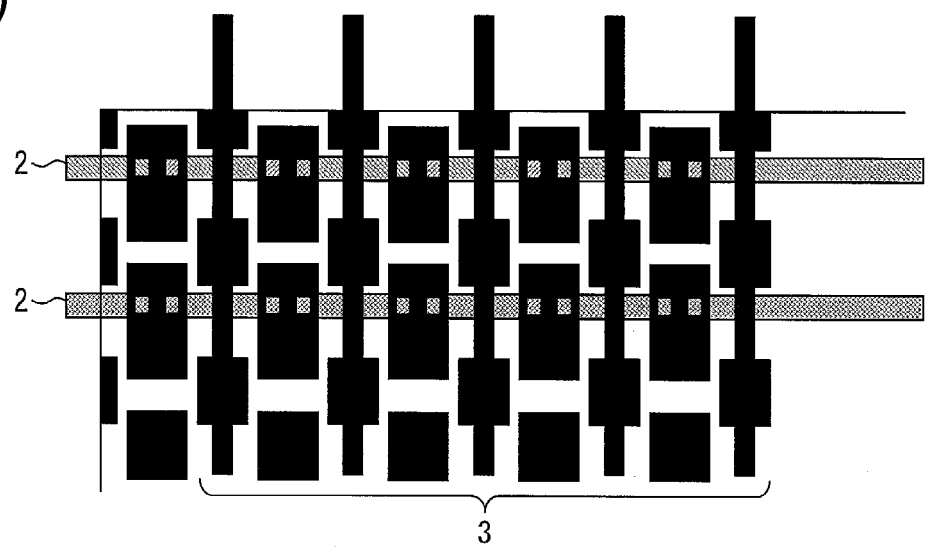
(b)
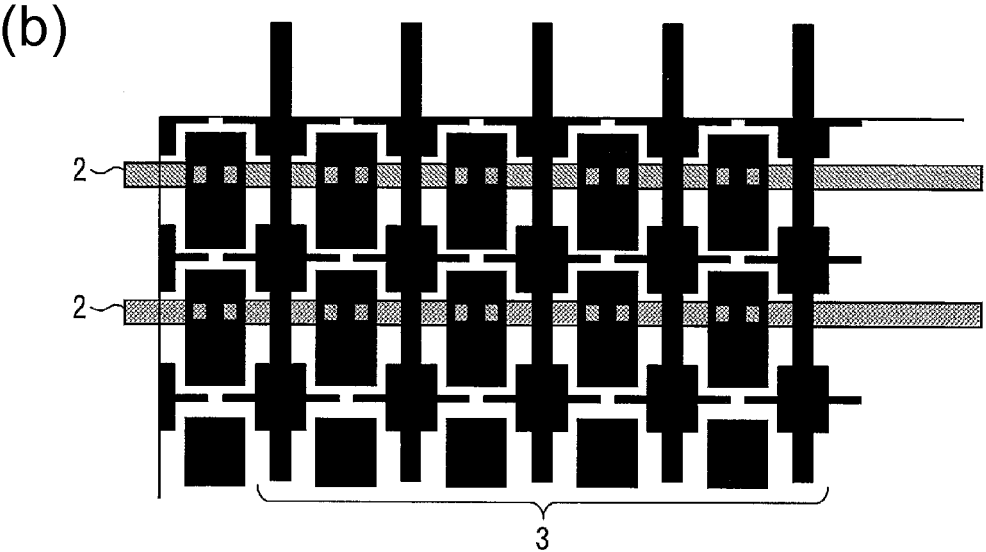

FIG. 4
(a)
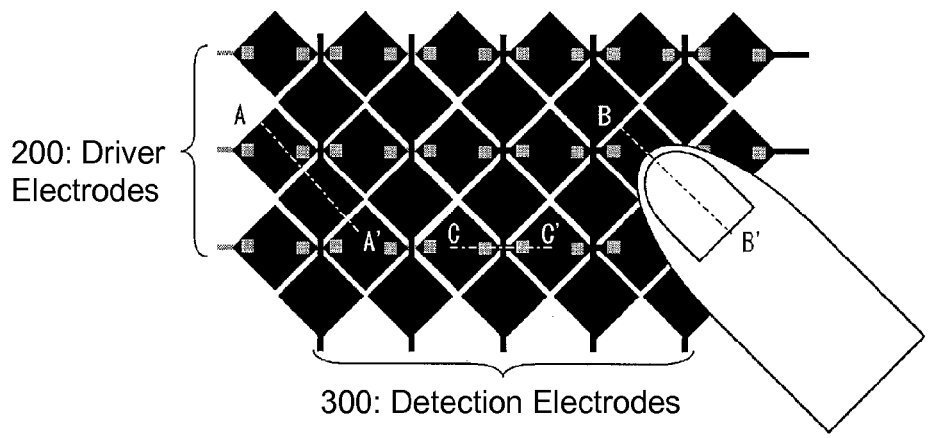
(b) A-A'     (c) B-B'
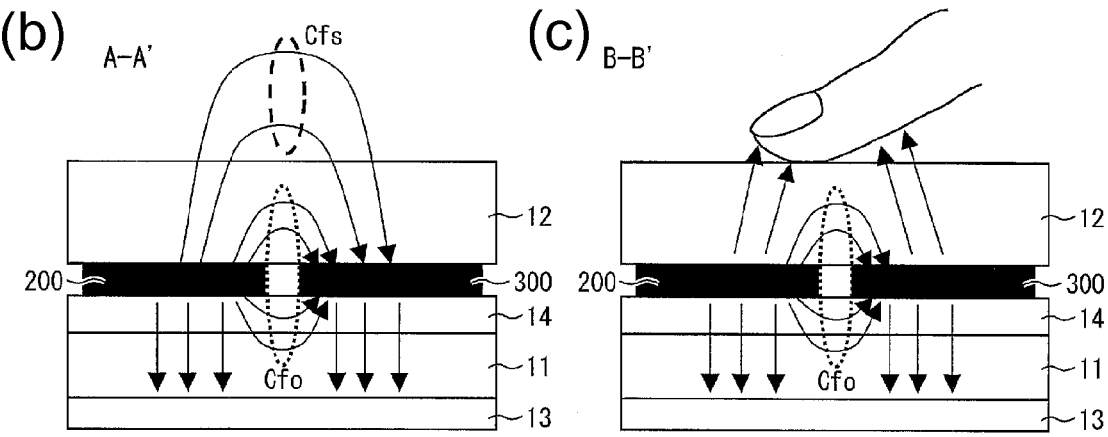
(d) C-C'
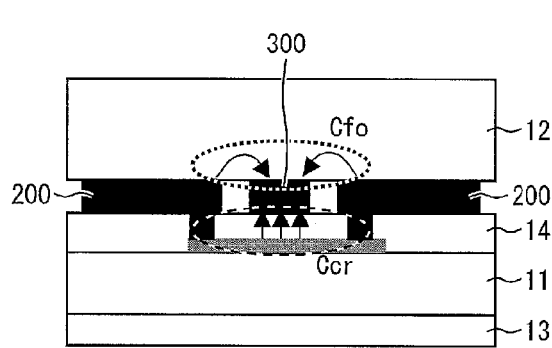

FIG. 6
(a)
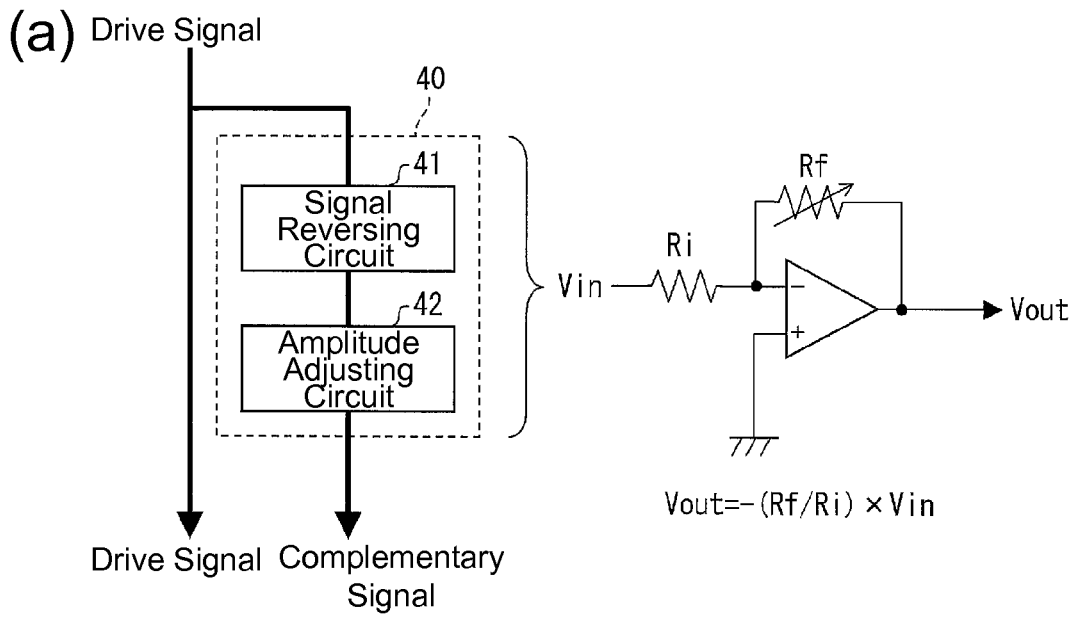
$Vout = -(Rf/Ri) \times Vin$
(b)
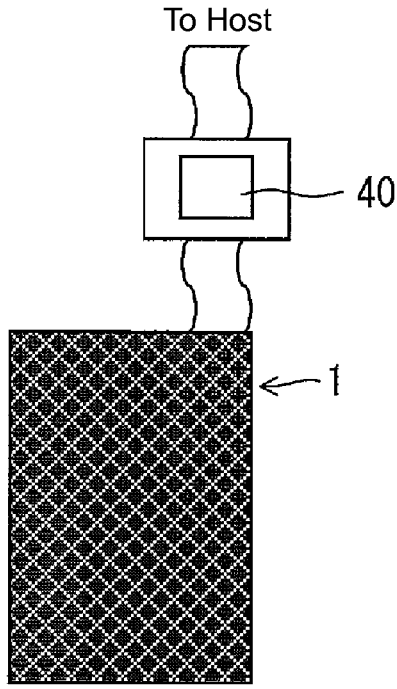

FIG. 8
(a) 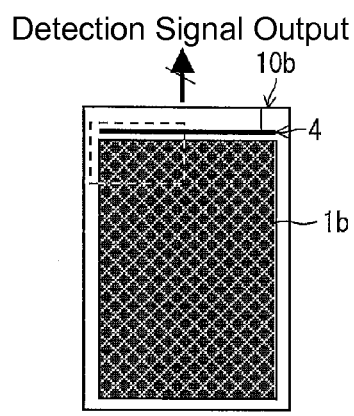
(b) 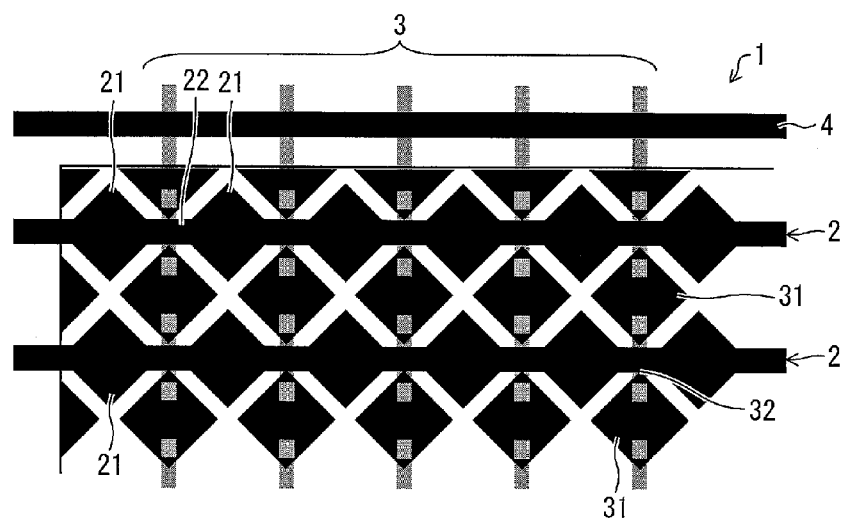
(c) 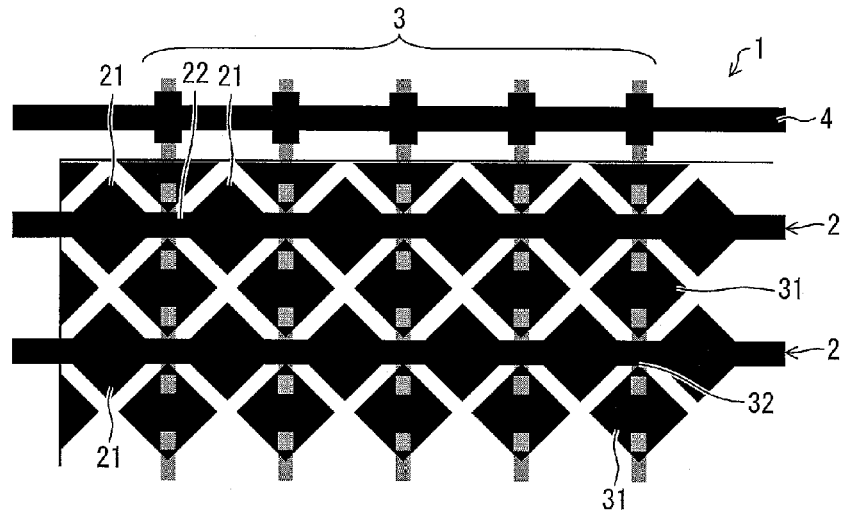

FIG. 9
(a)
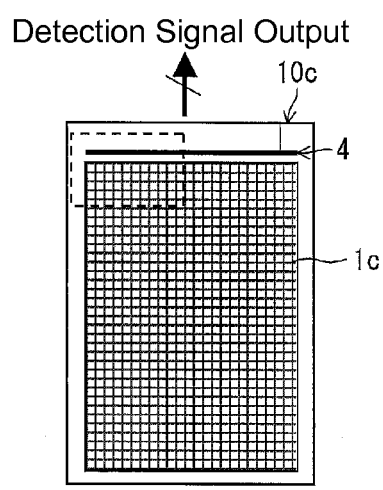
Detection Signal Output
(b)
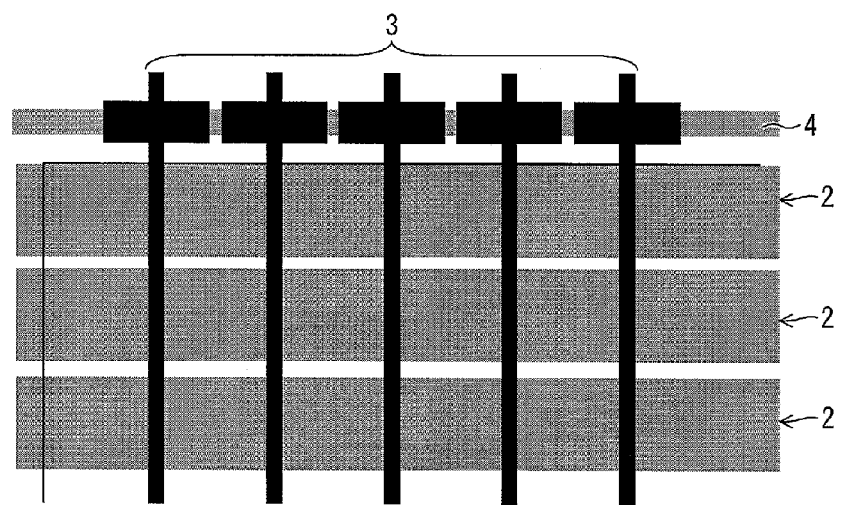
(c)
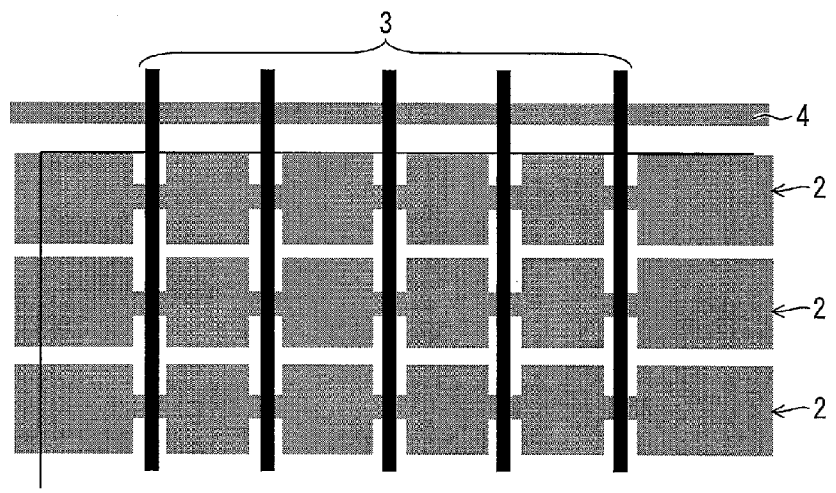

FIG. 10
(a) 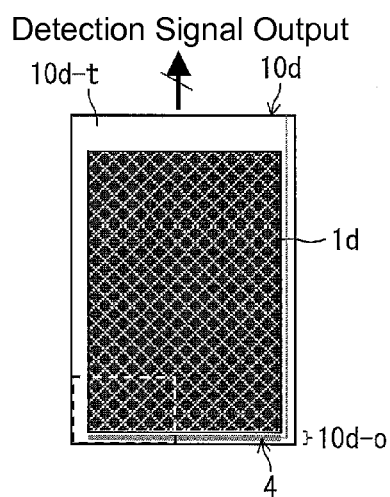
(b) 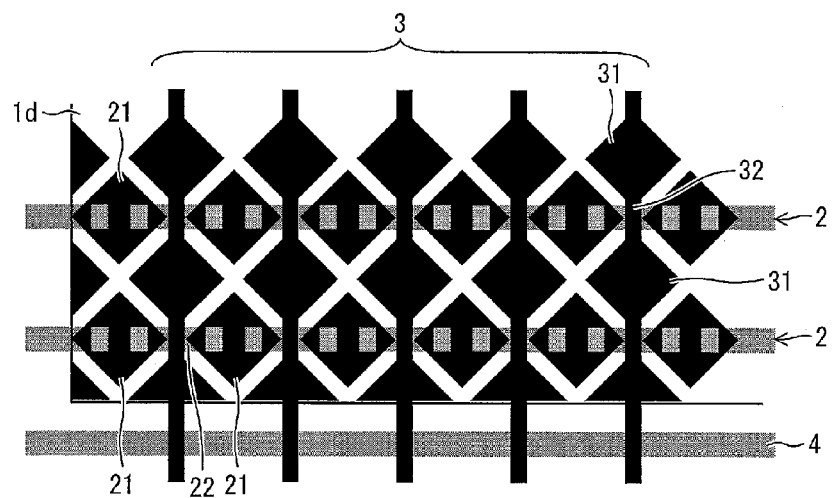
(c) 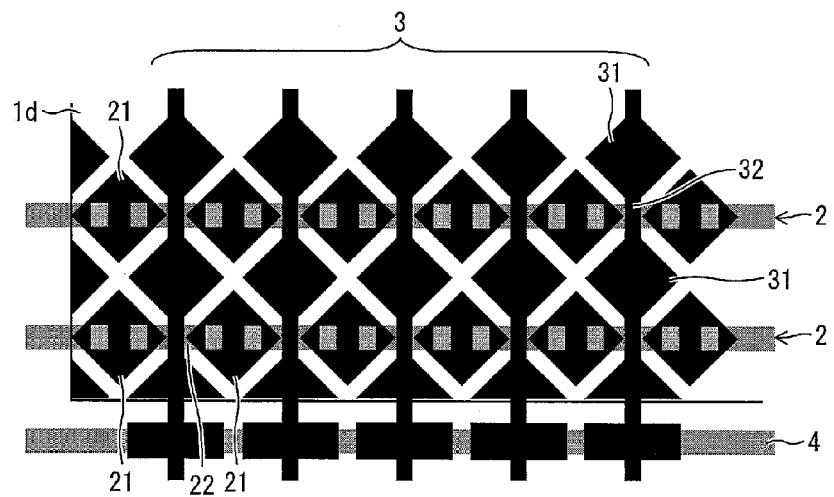

FIG. 13
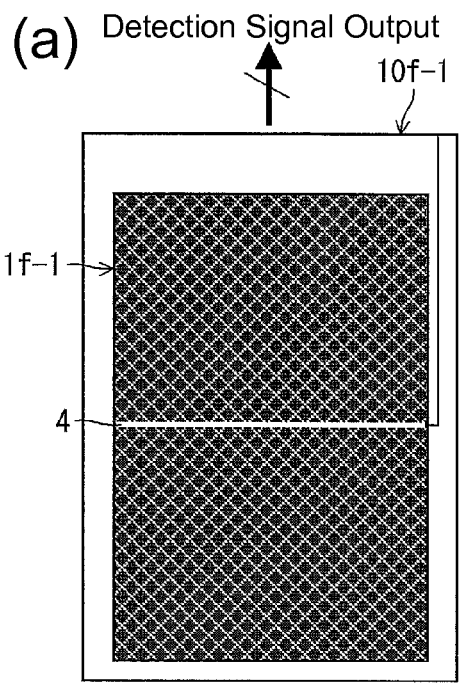
(a)
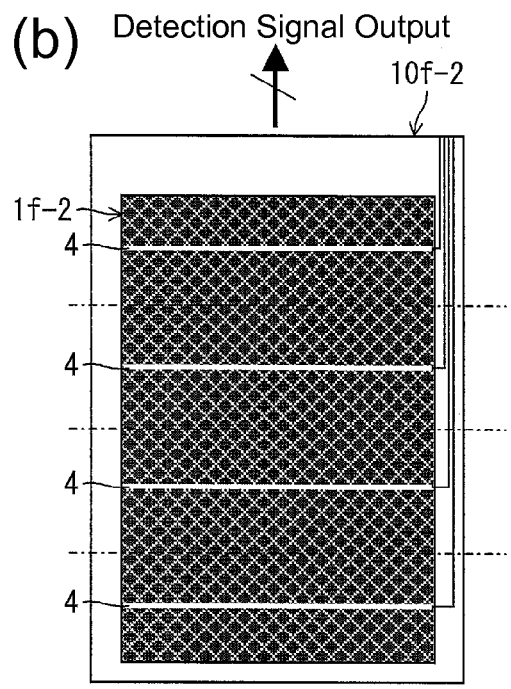
(b)
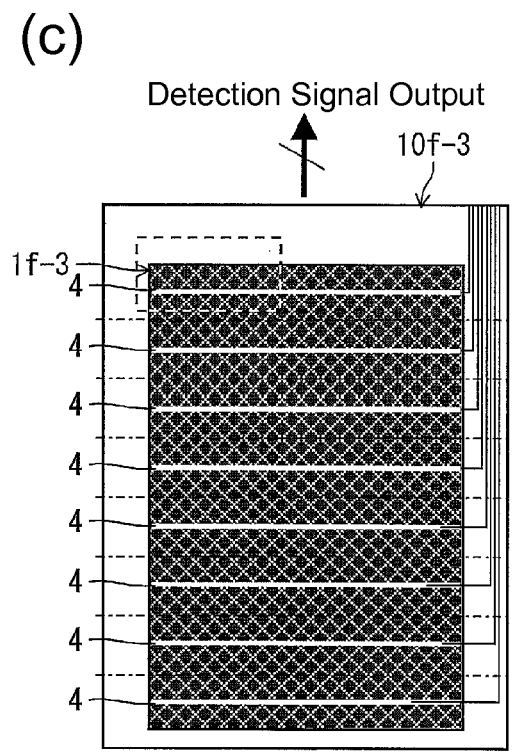
(c)
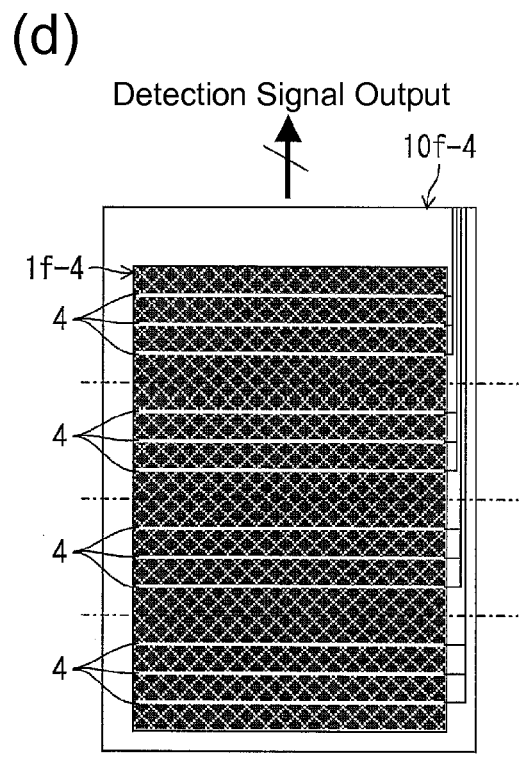
(d)

FIG. 17
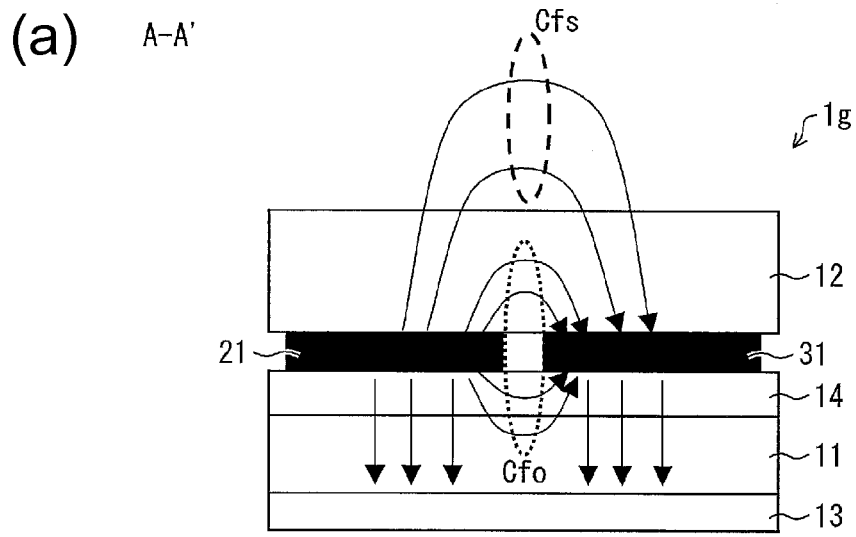
(a) A-A'
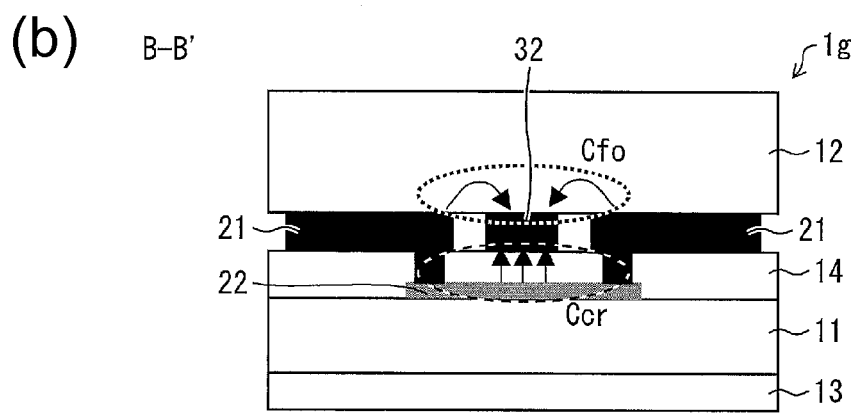
(b) B-B'
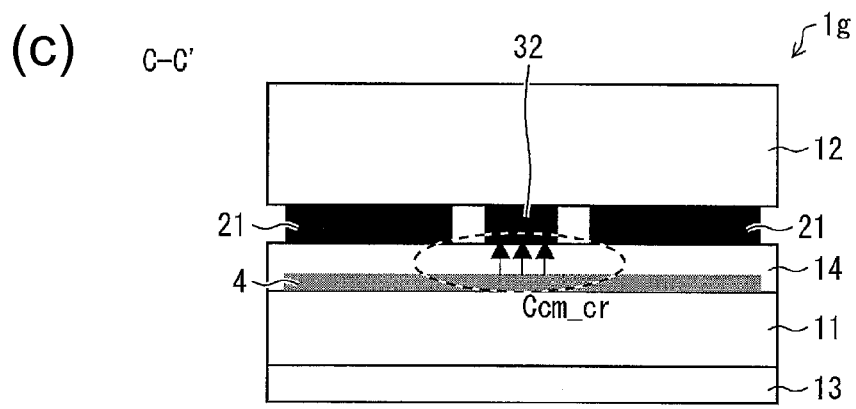
(c) C-C'

FIG. 19
(a)
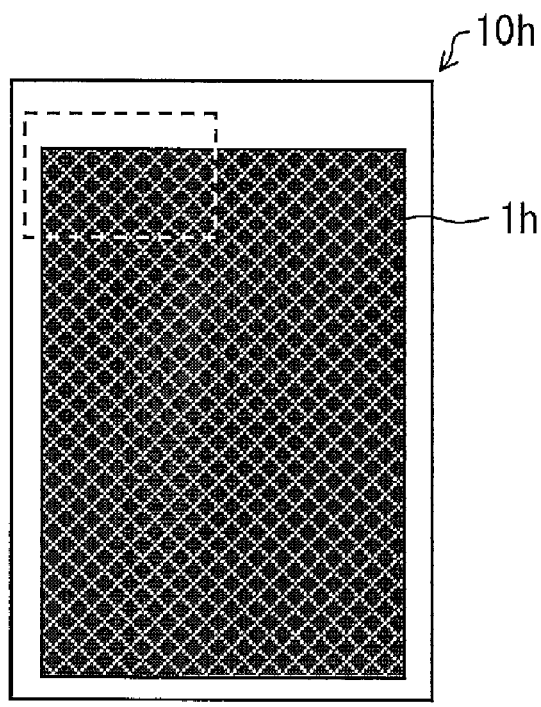
(b)
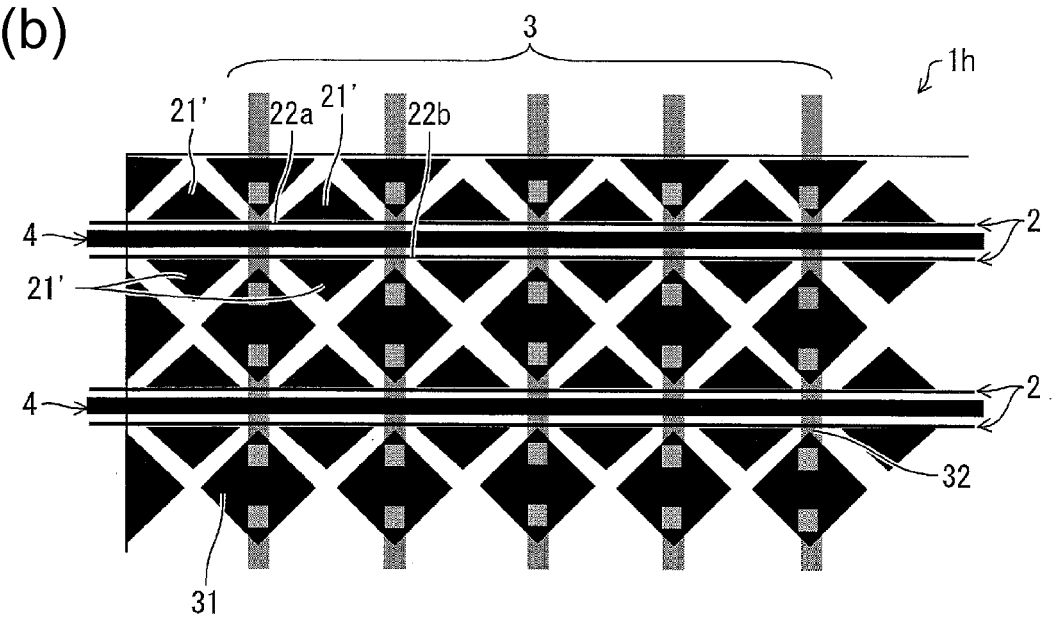

FIG. 20
(a)
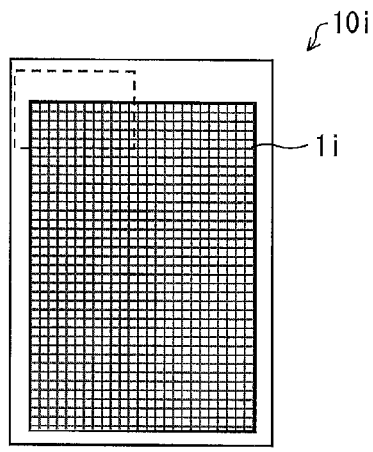
(b)
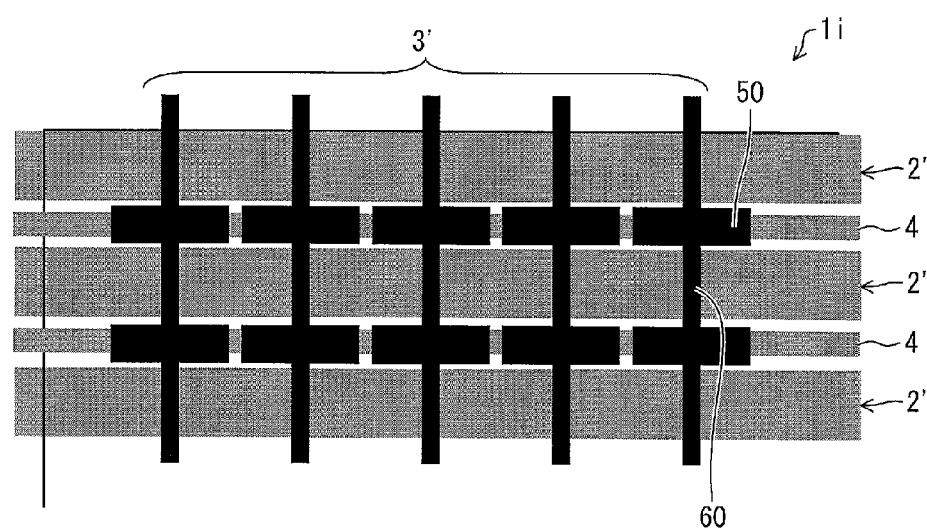
(c)
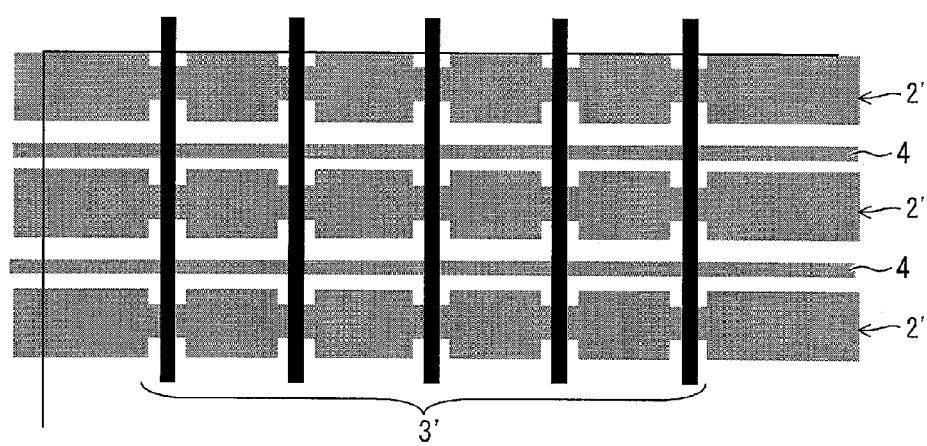

FIG. 29
(a)
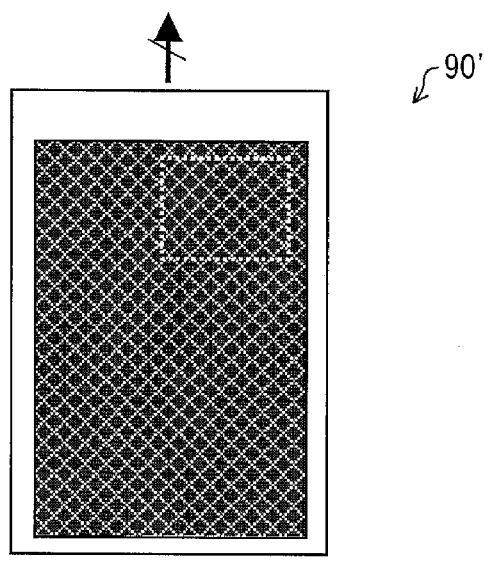
(b)
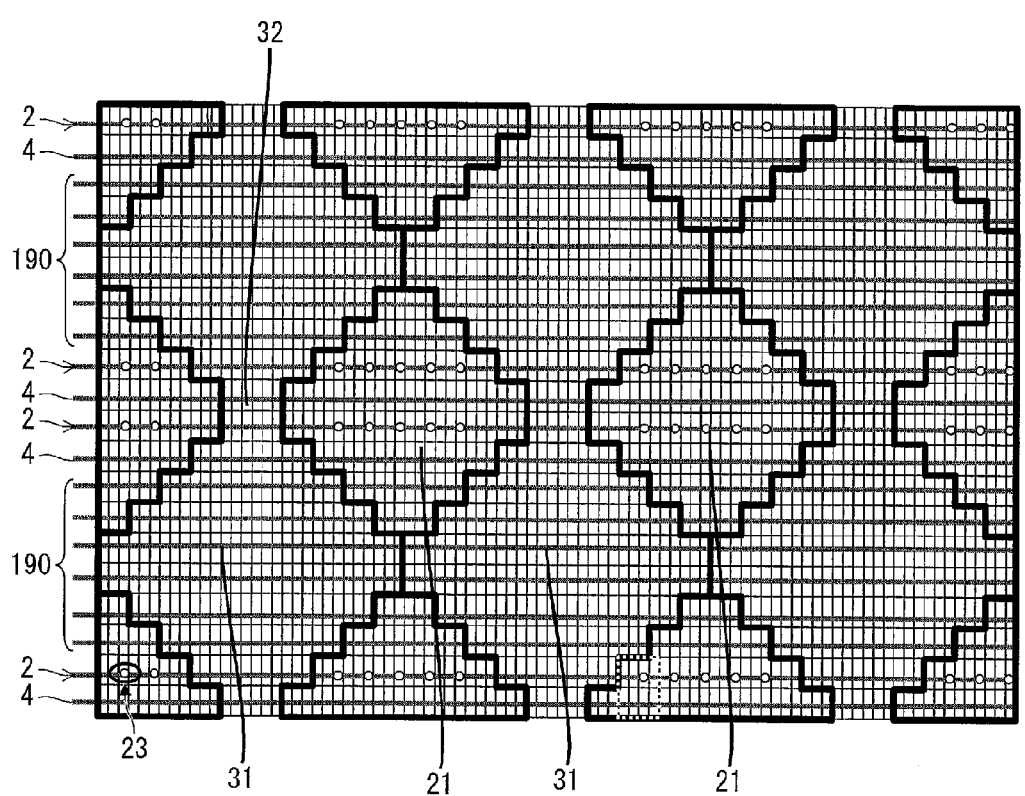

TOUCH PANEL AND DISPLAY DEVICE PROVIDED WITH SAME

TECHNICAL FIELD

The present invention relates to a touch panel that detects contact or approach of a finger, a stylus, or the like to a detection surface, and to a display device having such a touch panel function in the display part thereof.

BACKGROUND ART

A touch panel that detects that a finger, a stylus, or the like of a user has come into contact with or approached a detection surface is known. In recent years, electronic devices in which touch panel functions (also referred to as touch sensor functions) that can freely perform various functions just by having a stylus or the like touch the display screen are provided in a liquid crystal display element such as a liquid crystal display screen are starting to become widely used. Such a touch panel is formed onto a display panel, and by displaying various types of buttons on the display screen as images, it is possible to realize data input substituting these displayed buttons for normal buttons. Thus, when applying such a touch panel to a miniature mobile device, it is possible to have the display and buttons share a common space, thus presenting great advantages such as being able to increase the size of the display screen, decreasing the amount of space dedicated to control parts, or reducing the number of parts.

Additionally, a technique is known in which a touch panel shares some of the structure of the display part. For example, a configuration is known in which pixel electrodes or an opposite electrode for liquid crystal display, or the source bus lines double as one of the detection electrodes (detection lines) of a capacitance detection type touch panel. If the configuration is shared in this manner, it is also possible to attain the advantage that the device can be made thin.

However, if the detection electrode doubles as an electrode for display in this manner, the display driving frequency and the detection driving frequency match due to configurational reasons. As a result, even if an attempt is made to raise the detection driving frequency because the detection speed is low and the responsiveness to data input is bad, there is a problem that it is not possible to freely change the detection driving frequency due to restrictions in the display driving frequency.

Patent Document 1 discloses a contact detection device in which the detection speed is improved without raising the detection driving frequency. As shown in FIG. 31, in Patent Document 1, the touch panel 110 has a contact response part that includes driver electrodes E1 and detection electrodes E2, which respond to contact and cause an electrical change, and a contact driver scanning part 111. The contact driver scanning part 111 scans a detection surface 113A in one direction by applying drive voltage to the driver electrodes E1, and controls output of the electric change from the detection electrodes E2 in chronological order. At this time, the contact driver scanning part 111 performs a plurality of scans (Re1 and Re2) in parallel with a drive signal source S and an inverted drive signal source Sx for different regions in the touch panel 110. With this configuration, the detection speed is improved without raising the frequency for contact detection.

Also, as shown in FIG. 32, in Patent Document 1, the contact driver scanning part performs parallel scanning to two different regions in the contact response part and supplies drive voltages having phases that are 180° apart with respect to each other to the two regions, the contact driver scanning part controlling the output of electric change in chronological order by performing scanning in one direction on the detection surface by applying drive voltages to the contact response part, which causes electrical change in response to an object to be detected coming into contact or approaching the detection surface.

RELATED ART DOCUMENT

Patent Document

Patent Document 1: Japanese Patent Application Laid-Open Publication, "Japanese Patent Application Laid-Open Publication No. 2010-72743 (Published on Apr. 2, 2010)"

SUMMARY OF THE INVENTION

Problems to be Solved by the Invention

However, with the configuration of Patent Document 1, if objects to be detected come into contact with (approach) the same line in different contact response part regions, the electrical changes formed in the respective regions cancel each other out, resulting in no output.

In order to avoid this situation, a possible solution is to rely on instantaneous output change resulting from a time difference between the two contact (approach) points. However, this only works when the contact speed (i.e. the time difference) is sufficiently slower than the sensing speed, and if active sensing speed is slow (30 ms to a second, for example) such as when multiple unit output changes accumulate and are used as main output, when reactivating after standby, or the like, then there is a possibility of glitches such as non-detection occurring.

Means for Solving the Problems

The present invention takes into account the above-mentioned problems, and an object thereof is to provide a highly reliable touch panel in which glitches such as non-detection do not occur, and a display device provided therewith.

The inventors of the present invention have found that the above-mentioned object can be attained by mitigating the induction of an inactive charge among parasitic capacitance formed between the driver electrodes and the detection electrodes.

Thus, in order to solve the above-mentioned problems, the touch panel according to the present invention is a touch panel, having a touch panel region including a plurality of driver electrodes that extend in a row direction and a plurality of detection electrodes that extend in a column direction, the touch panel detecting that an object has come into contact with or approached a detection surface on the basis of a change in an amount of electric charge induced on the detection electrodes when a drive signal is applied to each of the driver electrodes, wherein a complementary electrode is disposed so as to extend along a direction in which the driver electrodes extend in the touch panel region or a region that is adjacent thereto, the complementary electrode forming along with the detection electrodes a capacitance substantially corresponding to a capacitance component that is not affected by a presence or absence of the object among capacitances formed between the driver electrodes and the detection electrodes, and wherein, when the drive signal is applied to each of the driver electrodes, a complementary signal having a reverse phase in relation to the drive signal is applied to the complementary electrode.

According to the configuration above, by providing a complementary electrode, it is possible to form between the complementary electrode and the detection electrode a parasitic capacitance corresponding to a capacitance component that does not affect detection, among the parasitic capacitances formed between the driver electrode and the detection electrode. Also, a complementary signal that has a reverse phase compared to the drive signal is applied to the complementary electrode.

With this configuration, of the parasitic capacitance formed between the driver electrodes and the detection electrodes, it is possible to cancel out the inactive charge generated in the capacitance component that does not affect the detection in accordance with the drive signal, using the charge generated by the complementary signal among the parasitic capacitance formed between the complementary electrode and the detection electrodes. In other words, it is possible to minimize the inactive charge, which is not affected by the object to be detected.

Also, even if objects to be detected are in contact with (approach) the detection surface on the same line, the electrical changes do not cancel each other out unlike the conventional configuration. Thus, glitches such as non-detection do not occur.

Therefore, according to the configuration of the present invention, it is possible to provide a highly reliable touch panel in which glitches such as non-detection do not occur.

The present invention also includes a display device provided with the above-mentioned touch panel.

Effects of the Invention

As stated above, a touch panel according to the present invention is a touch panel, having a touch panel region including a plurality of driver electrodes that extend in a row direction and a plurality of detection electrodes that extend in a column direction, the touch panel detecting that an object has come into contact with or approached a detection surface on the basis of a change in an amount of electric charge induced on the detection electrodes when a drive signal is applied to each of the driver electrodes, wherein a complementary electrode is disposed so as to extend along a direction in which the driver electrodes extend in the touch panel region or a region that is adjacent thereto, the complementary electrode forming along with the detection electrodes a capacitance substantially corresponding to a capacitance component that is not affected by a presence or absence of the object among capacitances formed between the driver electrodes and the detection electrodes, and wherein, when the drive signal is applied to each of the driver electrodes, a complementary signal having a reverse phase in relation to the drive signal is applied to the complementary electrode.

Also, the display device according to the present invention includes the above-mentioned touch panel.

With this configuration, it is possible to provide a highly reliable touch panel in which glitches such as non-detection do not occur, and a display device provided therewith.

BRIEF DESCRIPTION OF THE DRAWINGS

FIG. 1 shows configurations of a touch panel according to an embodiment of the present invention.

FIG. 2 shows other configurations of a touch panel region.

FIG. 4 shows a change in parasitic capacitance due to contact or non-contact of an object to be detected in the touch panel region shown in FIG. 1.

FIG. 6 shows a configuration of a touch panel according to another embodiment of the present invention.

FIG. 8 shows configurations of a touch panel according to another embodiment of the present invention.

FIG. 9 shows configurations of a touch panel according to another embodiment of the present invention.

FIG. 10 shows configurations of a touch panel according to another embodiment of the present invention.

FIG. 13 shows configurations of a touch panel according to another embodiment of the present invention.

FIG. 17 shows cross-sectional views of the touch panel region shown in FIG. 16.

FIG. 19 shows a configuration of a touch panel according to another embodiment of the present invention.

FIG. 20 shows configurations of a touch panel according to another embodiment of the present invention.

FIG. 29 shows a configuration of a display device according to another embodiment of the present invention.

DETAILED DESCRIPTION OF EMBODIMENTS

Embodiment 1

Figure 3:
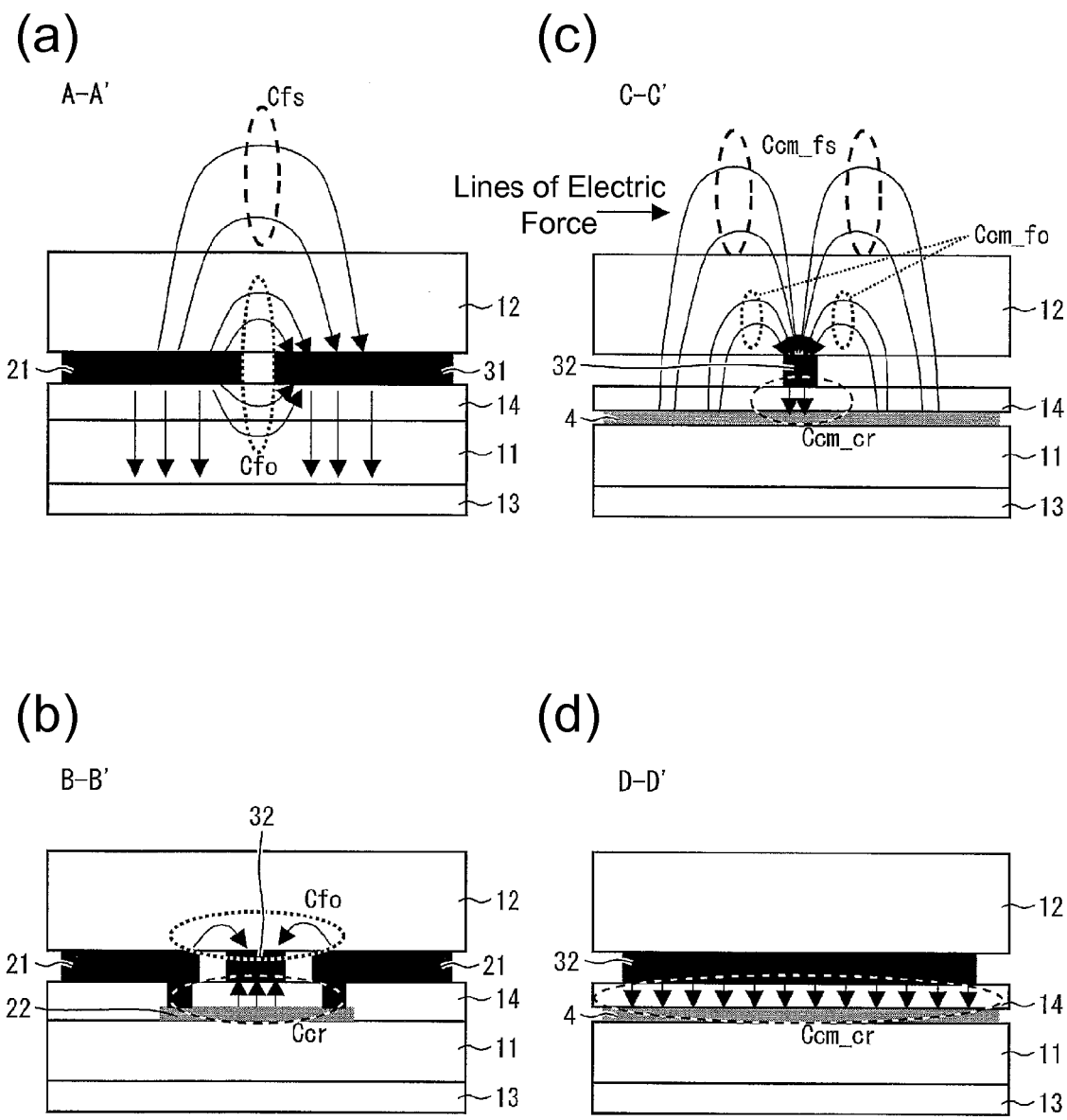
FIG. 3 shows cross-sectional views of the touch panel shown in FIG. 1.

An embodiment of the present invention will be explained below with reference to FIGS. 1 to 9.

First, an embodiment of a touch panel of the present invention will be explained, and then, an embodiment of a display device of the present invention will be explained.

(1) Configuration of Touch Panel

FIG. 1 shows a touch panel 10a of the present embodiment. FIG. 1(a) is a top view of the touch panel 10a, and FIG. 1(b) is a partial magnified view of the touch panel 10a in which the portion in the frame in FIG. 1(a) is magnified. FIG. 1(c) is a partial magnified view of a different configuration example of the touch panel 10a in which the portion in the frame in FIG. 1(a) is magnified.

The touch panel 10a of the present embodiment detects that a finger, a stylus, or the like of a user has come into contact with or approached a detection surface. Thus, as shown in FIG. 1(a), a touch panel 10a of the present embodiment has a touch panel region 1a. In actuality, a protective plate is disposed on the topmost surface of FIG. 1, which is a detection surface of the touch panel region 1a, but in FIG. 1, the protective plate is omitted.

A specific configuration of the touch panel region 1a will be described based on the touch panel region 1a shown in FIG. 1(b). The touch panel region 1a includes driver electrodes 2, and detection electrodes 3.

The portions in FIG. 1(b) depicted in grey indicate that these portions are on the same surface, or in other words, in the same layer as each other, and the portions depicted in black indicate that these portions are in a different layer from the grey portions but that the black portions are on the same surface, or in other words, in the same layer as each other. The grey portions are in a different layer from the black portions, and the black portions are closer to the detection surface than the grey portions.

As shown in FIG. 1(b), the driver electrodes 2 have a plurality of driver electrode parts 21, and the driver electrode parts 21 are interconnected by first bridge parts 22.

As shown in FIG. 1(b), the detection electrodes 3 also have a plurality of detection electrode parts 31, and the detection electrode parts 31 are interconnected by second bridge parts 32.

The driver electrode parts 21 and the detection electrode parts 31, as shown in FIG. 1(b), are in the same layer as each other. The second bridge parts 32 are also in the same layer as the driver electrode parts 21 and the detection electrode parts 31. On the other hand, the first bridge parts 22 are in a different layer from the driver electrode parts and the detection electrode parts. Specifically, the first bridge parts 22 are in a layer below the driver electrode parts 21, and, as is described below, are in the same layer as the complementary electrode 4. The first bridge parts 22 and the driver electrode parts 21 overlap each other with a dielectric layer therebetween, and both are electrically connected to each other in portions thereof by a connecting part that extends in a direction of overlap.

The driver electrode parts 21 are respectively quadrilaterals. The plurality of driver electrode parts 21 are aligned along the row direction such that a diagonal line drawn from one set of opposite corners in each quadrilateral extends in the row direction, and the driver electrode parts 21 that are aligned in the row direction are electrically connected to each other by the first bridge parts 22. There are a plurality of such rows, which are aligned in the column direction, parallel to each other. The first bridge parts 22 electrically connect driver electrode parts 21 aligned in the row direction. The driver electrode parts 21 are in a different layer than the first bridge parts 22, the first bridge parts 22 being in a lower layer than the second bridge parts 32, which separate driver electrode parts 21 adjacent to each other in the row direction in the same layer.

The detection electrode parts 31 are, in general, the same shape as the driver electrode parts 21, and are respectively quadrilaterals. The plurality of detection electrode parts 31 are aligned along the column direction such that a diagonal line drawn from one set of opposite corners in each quadrilateral extends in the column direction, and the detection electrode parts 31 that are aligned in the column direction are electrically connected to each other by the second bridge parts 32. There are a plurality of such columns, which are aligned in the row direction, parallel to each other.

The driver electrode parts 21 and the detection electrode parts 31 are disposed in an alternating fashion in the row direction and the column direction, respectively. Specifically, the driver electrode parts 21, as described above, are in the same layer as the detection electrode parts 31, and as shown in FIG. 1(b), are disposed along the row direction and the column direction such that the diagonal lines drawn from the sets of opposite corners of the quadrilaterals are aligned in individual lines. In other words, in regions other than the edges of the touch panel region 1a, four detection electrode parts 31 are disposed such that four sides of each driver electrode part 21 respectively face the detection electrode parts 31. In other words, a substantially quadrilateral space is formed in the center by a total of four detection electrode parts 31 in two rows and two columns, and in this space, one driver electrode part 21 is disposed. The second bridge parts 32 are disposed in the same layer so as to separate driver electrode parts 21 adjacent to each other in the row direction. This similarly applies to FIG. 1(c).

The shapes of the driver electrode parts and the detection electrode parts are not limited to the description above, and may be shapes shown in FIG. 2, for example.

FIG. 3 shows cross-sectional views of the touch panel 10a along the section line A-A', the section line B-B', the section line C-C', and the section line D-D' shown in FIGS. 1(b) and 1(c). The touch panel region 1a of the touch panel 10a will be described in detail using these cross-sectional views. FIG. 3(a) is a cross-sectional view of the touch panel 10a along the section line A-A' shown in FIG. 1(b). FIG. 3(b) is a cross-sectional view of the touch panel 10a along the section line B-B' shown in FIG. 1(b). FIG. 3(c) is a cross-sectional view of the touch panel 10a along the section line C-C' shown in FIG. 1(b). FIG. 3(d) is an arrow cross-sectional view of the touch panel 10a along the section line D-D' shown in FIG. 1(c).

As shown in FIGS. 3(a) to 3(d), the respective electrodes described above are disposed between the substrate 11 and the protective plate 12. A shield 13 is disposed on the substrate on the side thereof opposite to the protective plate 12. The shield 13 protects the touch panel 10a from external shocks, and protects the touch panel from external electromagnetic waves that interfere with the touch panel function, or in other words, the touch sensor function. The shield 13 can be made of a conventional material, and disposed using a conventional method.

In the position shown in FIG. 3(a), an insulating film 14 is formed on the substrate 11, and on the insulating film 14, the driver electrode parts 21 and the detection electrode parts 31 are provided.

The touch sensor function of the touch panel 10a of the present embodiment will be described.

FIG. 4 is a drawing for describing the touch sensor function having driver electrodes and detection electrodes with the same configuration as those in the touch panel of the present embodiment. In the position shown in FIG. 4(a), a voltage (drive signal) is applied to the driver electrodes 200, and as shown in the lines of electric force indicated with arrows in FIG. 4(b), a parasitic capacitance is formed between the driver electrode 200 and the detection electrode 300 through the insulating film 14, the substrate 11, and the protective plate 12. In this state in which the parasitic capacitance is formed, if a finger, for example, comes into contact with or approaches the detection surface as shown in FIGS. 4(a) and 4(c), the parasitic capacitance changes, and by detecting this change in the detection electrodes 300, it is possible to detect contact or approach to the detection surface. This is the principle behind the so-called capacitive touch sensor. Below, only a case in which contact is made is described, but the description applies similarly to approach as well.

When viewing the parasitic capacitance in detail with reference to FIGS. 4(b) to 4(d), it is possible to see that a parasitic capacitance Cfo that does not change even if a finger comes into contact is present. This parasitic capacitance Cfo is a component that does not react to an object to be detected.

In other words, between the driver electrode 200 and the detection electrode 300 in the same layer as each other, there is both a parasitic capacitance Cfo that is not affected by the object to be detected, and a parasitic capacitance Cfs that is affected by the object to be detected.

The parasitic capacitance Cfo is also formed between the driver electrodes and the second bridge part in the same layer as each other, as shown in FIG. 4(d). The driver electrodes and the second bridge parts are close to each other, and here as well, a parasitic capacitance Cfo is formed regardless of whether or not a finger has come into contact.

As shown in FIG. 4(d), a parasitic capacitance Ccr is formed between the first bridge part 22, which electrically connects driver electrode parts 21 aligned in the row direction, and the second bridge part 32, regardless of whether or not a finger has come into contact.

These parasitic capacitances Cfo, Cfs, and Ccr are also shown in FIG. 3.

Furthermore, as shown in FIG. 3(c), in the present embodiment, a parasitic capacitance Ccm_cr is formed between the complementary electrode 4 to be described later and the detection electrodes 3.

To summarize,

Cfo is a component of the fringe capacitance between the driver electrodes and the detection electrodes that does not react to an object to be detected, Cfs is a component of the fringe capacitance between the driver electrodes and the detection electrodes that reacts to an object to be detected, Ccr is a component of the cross capacitance between the driver electrodes and the detection electrodes that reacts to an object to be detected, and Ccm_cr is a cross capacitance between the detection electrodes and the complementary electrode. Here, fringe capacitance refers to capacitance formed within the same layer, and cross capacitance refers to capacitance formed in different layers.

To reiterate the explanation of the principle of the touch sensor function, if the capacitance between the driver electrodes and the detection electrodes is Cf, then an electric charge Q induced on the detection electrode if the driver electrode is driven once at $\Delta Vdr$ is expressed in the following formula:

$$Q = \Delta Vdr \times Cf.$$

Based on FIG. 4, the non-contact state capacitance Cf and the contact state capacitance Cf are as follows:

in the non-contact state, $Cf = Cfo + Cfs + Ccr$, and in the contact state, $Cf = Cfo + Ccr$.

Where the non-contact state induced charge is Q and the contact state induced charge is Q@Touch, $$Q = \Delta Vdr \times (Cfo + Cfs + Ccr), \text{ and}$$

$$Q@\text{Touch} = \Delta Vdr \times (Cfo + Ccr)$$

and a charge Qsig representing the detected signal is such that $$\text{Qsig} = Q - Q@\text{Touch} = \Delta Vdr \times Cfs.$$

Thus, the circuit receiving the induced charge (integrator or decision circuit) uses, for determination, the width of the detected signal charge Qsig upon obtaining a sufficient width to be able to receive a non-contact state induced charge Q as an input dynamic range.

Figure 5:
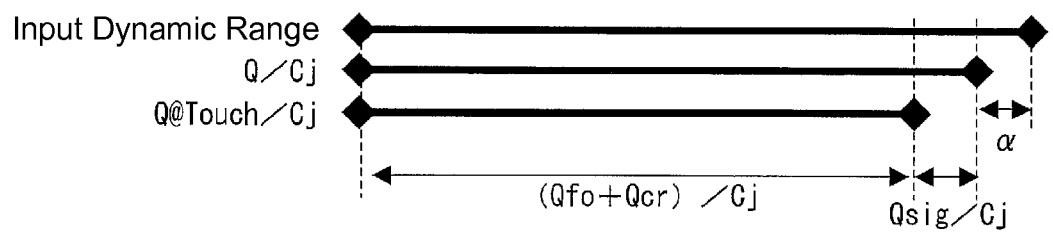
FIG. 5 schematically shows a relation between widths of an input dynamic range, an induced electric charge Q in a non-contact state, an induced electric charge Q@Touch in a contact state, and a detected signal charge Qsig in the touch panel shown in FIG. 1.

FIG. 5 schematically shows the relation of the widths of the input dynamic range, the non-contact state induced charge Q, the contact state induced charge Q@Touch, and the detected signal charge Qsig. In FIG. 5, $\alpha$ represents the input dynamic range margin, and Cj represents the received capacitance value (value of capacitance in which the induced charge is charged).

In FIG. 5, Qsig/Cj is the width used in order to determine whether or not contact has actually taken place.

Based on FIG. 5, the real determination width ratio Rd for the dynamic range is as follows:

$$Rd = Cfs / ((Cfo + Cfs + Ccr) + \alpha Cj / \Delta Vdr).$$

In FIG. 5, (Qfo+Qcr)/Cj does not contribute to determination. An object of the present invention is to reduce this portion. In other words, the object is to mitigate charge of this portion.

In order to attain this object, in the present embodiment, as shown in FIGS. 1 to 3, a complimentary electrode 4 is provided.

The complementary electrode 4 is one electrode line that extends parallel (row direction) to the driver electrodes 2 along the extension direction thereof, and is disposed in a panel terminal frame region 10a-t (adjacent region) that is outside of the touch panel region 1a of the touch panel 10a shown in FIG. 1, and is adjacent to the touch panel region 1a.

The panel terminal frame region 10a-t is a terminal frame region provided with the respective terminals of the driver electrodes 2, the detection electrodes 3, and the complementary electrode 4. Here, the terminal frame region signifies a region between a display region edge and a section face of glass. This region does not have pixels for performing display, but has various circuits for realizing the display function (such as switches for sampling image signals and driver ICs that generate and supply control signals for the switches); respective terminals of the driver electrodes 2, the detection electrodes 3, and the complementary electrode 4; and terminals for inputting control signals and image signals for the display circuit.

As shown in FIGS. 1 and 3, the complementary electrode 4 is in the same layer as the first bridge part 22. To explain this based on FIG. 1(b), as for the complementary electrode 4 disposed in this manner, where the parasitic capacitance between the complementary electrode and the detection electrode is Ccm (=Ccm_cr+Ccm_fs+Ccm_fo), and the complementary signal amplitude is ΔVcm, the amount of charge induced when the complementary electrode and the driver electrode are driven simultaneously is as follows:

$$Q=\Delta Vdr\times(Cfo+Cfs+Ccr)+\Delta Vcm\times Ccm, \text{ and}$$

$$Q@\text{Touch}=\Delta Vdr\times(Cfo+Ccr)+\Delta Vcm\times Ccm.$$

Here, by setting ΔVcm and Ccm (=Ccm_cr+Ccm_fs+Ccm+fo) such that $$\Delta Vcm\times Ccm \approx -\Delta Vdr\times(Cfo+Ccr),$$

it is possible to mitigate the occurrence of charge that does not contribute to determination. Here, the capacitance component Ccm_fs, which is affected by the object to be detected, is included in Ccm, but by making the complementary electrode 4 sufficiently thin, it is possible to satisfy Cfs>>Ccm_fs, and thus, in reality, Ccm_fs is negligible. Also, as shown in FIG. 1(c), by having the portion of the detection electrode overlapping the complementary electrode have a wide electrode width, it is possible to avoid forming Ccm_fs. The configuration of FIG. 1(b) or FIG. 1(c) may be chosen depending on the desired value of ΔVcm for complementary driving.

In this manner, the configuration is such that when applying the drive signal to the driver electrodes 2, a complementary signal (ΔVcm) at a different phase from the drive signal is applied to the complementary electrode 4, and the complementary signal (ΔVcm) satisfies the following formula:

$$\Delta Vcm=-\Delta Vdr\times(Cfo+Ccr)/Ccm$$

Cfo+Ccr in the formula corresponds to Cf−Cfs, and to a capacitance component unnecessary for detection.

The complementary signal is generated by a complementary signal generating circuit installed in the touch panel, and this complementary signal generating circuit is configured such that the drive signal is inputted thereto. The complementary signal generating circuit inverts the inputted drive signal, thus generating the complementary signal. Thus, an appropriate complementary signal based on the drive signal is generated and applied to the complementary electrode.

Specifically, it is possible to install a complementary signal generating circuit shown in FIG. 6, for example. In FIG. 6, after inputting the drive signal to a signal reversing circuit and reversing the signal polarity thereof, the amplitude of the signal is changed by an amplitude adjusting circuit, thereby resulting in the complementary signal.

In order to install the circuit and adjust the complementary signal, one method is to perform a calibration step when the touch panel is to be shipped, for example. By bringing a conductive plate into contact with the touch panel so as to cover the touch panel (Cfs=0) and setting ΔVcm such that the detection electrode signal output at that time is minimal compared to the driver electrode signal, it is possible to attain a complementary signal ideal for canceling out the inactive charge. An example of an adjusting method at this time is to set Rf in the complementary signal generating mechanism shown in FIG. 6(a) as volume resistance, and manually setting ΔVcm while monitoring the detection electrode signal. It is also possible to automate this step by having a similar control function in the complementary signal generating mechanism (40 in FIG. 6(b)).

Figure 7:
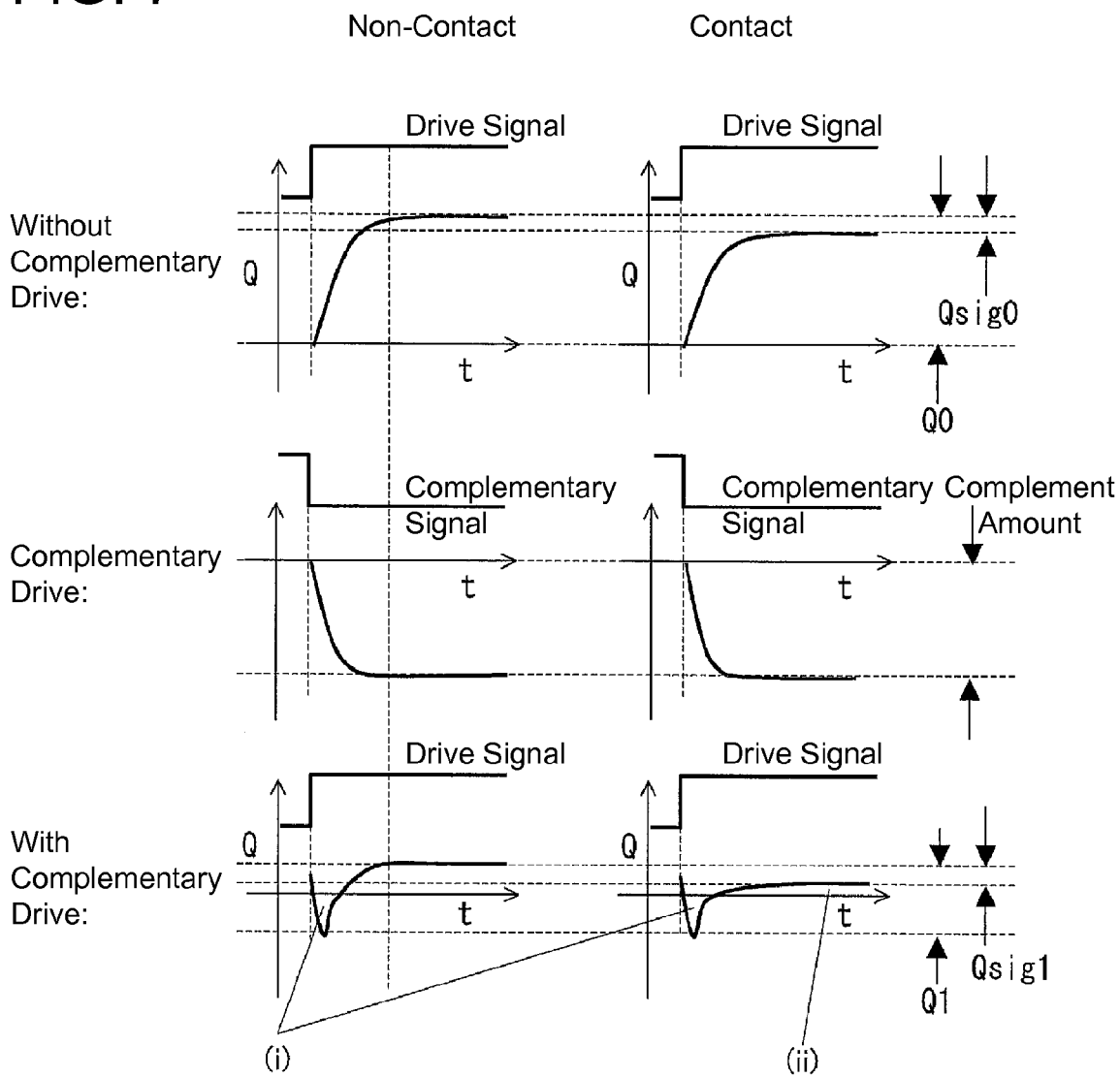
FIG. 7 is a drawing for explaining the effect of the complementary electrode.

FIG. 7 is a drawing for describing effects by the complementary electrode 4.

The respective graphs of FIG. 7 have the horizontal axis as time. The left three graphs of FIG. 7 show a non-contact state, and the right three graphs thereof show a contact state. The top two graphs of FIG. 7 show a relation between time "t" and charge amount "Q" (vertical axis) in a comparison example in which a complementary electrode is not provided. The middle two graphs of FIG. 7 show a relation between time "t" and the complement amount (vertical axis) of the complementary electrode. The bottom two graphs of FIG. 7 show a relation between time "t" and the charge amount "Q" (vertical axis) when the complementary electrode and the driver electrodes are driven.

In the top two graphs of FIG. 7, Q0 represents the total signal amount and Qsig0 represents a net signal amount, or in other words, the signal amount for detecting whether or not there is contact. As described above in FIG. 5, Qsig0 satisfies the following:

$$Qsig0=Q-Q@\text{Touch}=\Delta Vdr\times Cfs.$$

This represents the difference between the amount of charge induced on the detection electrode when there are no objects to be detected, and the amount of charge induced on the detection electrode when an object to be detected has come into contact (approached) with the detection electrode.

The top two graphs of FIG. 7 indicate that the amount of change in the charge (=net signal amount Qsig0) resulting from an object to be detected is small in relation to the total amount of charge (=total signal amount Q0) including charge that is not affected by the object to be detected.

When the drive signal shown in the top two graphs of FIG. 7 is applied, the complementary signal shown in the middle two graphs of FIG. 7 is applied to the complementary electrode, and thus, as shown in the bottom two graphs of FIG. 7, a total signal amount Q1 and a net signal Qsig1 result from applying the drive signal.

The positions indicated with (i) in the bottom two graphs of FIG. 7 are positions in which a difference due to a time constant occurs in the detection electrode. The position indicated with (ii) is a position where a residual effect between ΔVcm×Ccm and ΔVdr×(Cfo+Ccr) appears.

The top two graphs and the bottom two graphs of FIG. 7 have the following relationship:

$$Q1<Q0,$$

$$Qsig1 \approx Qsig0, \text{ and}$$

$$Qsig/Q1>Qsig0/Q0.$$

Thus, as a result of the touch panel 10a according to the present invention having the complementary electrode 4, (1) it is possible to reduce the input dynamic range of the charge receiving circuit depending on the total signal amount, thereby attaining low power consumption by performing low voltage driving, and (2) it is possible to improve signal resolution (resolution). As an example, if the total signal amount has a 12-bit resolution, then if Qsig1/Q1=½ and Qsig0/Q0=¼, then the resolution of Qsig1 is 11-bit and the resolution of Qsig0 is 10-bit.

(2) Effects of the Present Embodiment

As stated above, according to the configuration of the touch panel 10a of the present embodiment, by disposing a complementary electrode 4, it is possible to form between the complementary electrode 4 and the detection electrode 3 a parasitic capacitance corresponding to a capacitance component that does not affect detection, among the parasitic capacitance formed between the driver electrode 2 and the detection electrode 3. Also, a complementary signal that has a reverse phase compared to the drive signal is applied to the complementary electrode.

As a result, the inactive charge generated as a result of the drive signal at a capacitance component that does not affect detection among the parasitic capacitance formed between the driver electrodes and the detection electrodes can be canceled out by charge generated as a result of the complementary signal at the parasitic capacitance formed between the complementary electrode and the detection electrodes. In other words, it is possible to minimize the inactive charge that does not react to the object to be detected.

Also, even if objects to be detected are in contact with (approach) the detection surface on the same line, the electrical changes do not cancel each other out unlike the conventional configuration. Thus, glitches such as non-detection do not occur.

Therefore, according to the configuration of the present invention, it is possible to provide a highly reliable touch panel in which glitches such as non-detection do not occur.

Also, by disposing the complementary electrode outside of the touch panel region, compared to a case in which the complementary electrode is formed in the touch panel region, it is possible to prevent the formation of regions where the touch function is inactive. Also, compared to a case in which the complementary electrode is formed in the touch panel region, it is possible to prevent a decrease in plane resolution. Furthermore, compared to a case in which the complementary electrode is formed in the touch panel region, there is more design flexibility in the shape of the complementary electrode, and a more efficient attainment of compensatory effects can be anticipated. According to the configuration above, of the frame region, which is peripheral to the touch panel region, only the terminal frame region is used, and thus, it is possible to narrow the frame in other regions of the frame region. Also, if this touch panel is installed in a display device, the complementary electrode is disposed outside of the touch panel region as described above, and thus, it is possible to prevent the complementary electrode from being seen.

(3) Modification Examples

Two modification examples will be described as modification examples of the present embodiment below.

Modification Example 1

FIG. 8 shows a configuration of Modification Example 1 of the present embodiment. FIG. 8(*a*) is a top view of a touch panel 10*b* of Modification Example 1, and FIG. 8(*b*) is a partial magnified view of the touch panel 10*b* in which the portion in the frame in FIG. 8(*a*) is magnified. FIG. 8(*c*) is a partial magnified view of a different configuration example of the touch panel 10*b* in which the portion in the frame in FIG. 8(*a*) is magnified. FIG. 8 corresponds to FIG. 1.

The touch panel 10*a* of FIG. 1 described above has the driver electrode parts 21 in a different layer from the first bridge parts 22, and the first bridge parts 22 are in a layer below the second bridge parts 32, which are in the same layer as the driver electrode parts 21 while separating driver electrode parts 21 that are adjacent in the row direction. Also, in the touch panel 10*a* of FIG. 1, the complementary electrode 4 is in the same layer as the first bridge parts 22 and in a layer below the second bridge parts 32.

By contrast, in the touch panel 10*b* of Modification Example 1, the driver electrode parts 21, the detection electrode parts 31, the first bridge parts 22, and the complementary electrode 4 are in the same layer, and the second bridge parts 32 are in a layer below. In other words, the second bridge parts 32 are in a layer below the first bridge parts 22, which are in the same layer as the detection electrode parts 31 and separate detection electrode parts 31 adjacent to each other in the column direction.

In the configuration of FIG. 8 also, a parasitic capacitance corresponding to a capacitance component that does not affect detection among the parasitic capacitance formed between the driver electrodes 2 and the detection electrodes 3 is formed between the complementary electrode 4 and the detection electrodes 3.

Modification Example 2

FIG. 9 shows a configuration of Modification Example 2 of the present embodiment. FIG. 9(*a*) is a top view of a touch panel 10*c* of Modification Example 2, and FIG. 9(*b*) is a partial magnified view of the touch panel 10*c* in which the portion in the frame in FIG. 9(*a*) is magnified. FIG. 9(*c*) is a partial magnified view of a different configuration example of the touch panel 10*c* in which the portion in the frame in FIG. 9(*a*) is magnified. FIG. 9 corresponds to FIG. 1.

The touch panel 10*a* of FIG. 1 described above has a configuration in which the driver electrodes 2 have quadrilateral driver electrode parts 21, and first bridge parts 22, which are formed in a different layer from the driver electrode parts and connect driver electrode parts 21 in the row direction. By contrast, in the touch panel 10*c* of Modification Example 2, the detection electrodes 3 and the driver electrodes 2 are formed in different layers from each other while being all in respective individual layers.

Also, in the case of the touch panel 10*c* of Modification Example 2, the driver electrodes 2 and the complementary electrode 4 are in the same layer, and the detection electrodes 3 are closer to the detection surface than the driver electrodes 2 and the complementary electrode 4.

In the configuration of FIG. 9 also, a parasitic capacitance corresponding to a capacitance component that does not affect detection among the parasitic capacitance formed between the driver electrodes 2 and the detection electrodes 3 is formed between the complementary electrode 4 and the detection electrodes 3.

Here, among the capacitance formed between the driver electrodes and the detection electrodes, the capacitance component affected by the object to be detected is the component resulting from lines of electric force moving towards the detection electrodes, which are in a layer above the driver electrodes, from the outside lower layer. Even in the case of a complementary electrode also formed in the lower layer, if the detection electrodes in the layer thereabove have the same shape as on the driver electrodes, then similar lines of electric force result, which causes a parasitic capacitance affected by the object to be detected to be present (corresponding to Ccm_fs in FIG. 3(*c*)). Here, if the width of the driver electrodes and the complementary electrode differs, then the value of Cfs changes proportionally, and thus, making the complementary electrode sufficiently narrow is one method of decreasing the parasitic capacitance affected by the object to be detected (corresponding to FIGS. 1(*b*) and 8(*b*)). A further method of improvement with respect to this issue is to have the detection electrode be wide where it overlaps the complementary electrode, as shown in FIGS. 8(*c*) and 9(*b*). The detection electrodes are made wider on the complementary electrode, and block electrical lines drawn from the outside lower layer, thereby minimizing the capacitance component between the complementary electrode and the detection electrodes affected by the object to be detected.

As in FIG. 9(c), it is possible to have the shape of the driver electrodes 2 only be different where they overlap the detection electrodes 3. In this case, it is possible to reduce cross capacitance, which is one of the capacitance components between the driver electrodes 2 and the detection electrodes 3 that is not affected by the object to be detected, and as a result, it is possible to have the complementary electrode 4 be thin. Therefore, effective complementary driving can be attained without widening the detection electrode at the overlapping portion thereof with the complementary electrode, unlike in FIG. 9(b).

In the configuration of FIGS. 1 to 8, it is easier to form Cfs, which is a capacitance component affected by the object to be detected, because the driver electrode parts and the detection electrode parts are disposed in the same layer adjacent to each other, than in the configuration of FIG. 9. On the other hand, the configuration of FIG. 9 has the advantage in being easier to manufacture compared to the configuration of FIGS. 1 to 8 due to the fact that contact is unnecessary.

Embodiment 2

Another embodiment according to the present invention is as described below with reference to FIGS. 10 and 11. In the present embodiment, differences from Embodiment 1 above will be described, and for ease of explanation, components having the same functions as those described in Embodiment 1 are given the same reference characters, and the descriptions thereof are omitted.

The only difference between the touch panel of Embodiment 1 described above and a touch panel of the present embodiment is where the complementary electrode 4 is disposed. Details thereof will be explained below.

FIG. 10 shows a touch panel 10d of the present embodiment. FIG. 10(a) is a top view of the touch panel corresponding to FIG. 1(a), and FIG. 10(b) is a partial magnified view of the touch panel 10d in which the portion in FIG. 10(a) inside the frame is magnified. FIG. 10(c) is a partial magnified view of a different configuration example of the touch panel 10d in which the portion in the frame in FIG. 10(a) is magnified.

In Embodiment 1 described above, the complementary electrode 4 is provided in the panel terminal frame region 10a-t outside of the touch panel region. By contrast, in the touch panel 10d of the present embodiment, the complementary electrode 4 is provided not in a panel terminal frame region 10d-t, but in an opposite region 10d-o, which is a region outside of the touch panel region 1d opposite to the panel terminal frame region 10d-t across the touch panel region.

The complementary electrode 4 provided in the opposite region 10d-o intersects with detection electrodes 3. As shown in FIG. 10, wiring lines connected to the complementary electrode 4 may pass to the left and/or the right of the touch panel region 1d in the touch panel 10d.

Effects of the present embodiment will be described below based on FIG. 11. FIG. 11(a) is a graph that shows the compensatory effect on the charge by the complementary electrode in the configuration of the touch panel 10a of FIG. 1 in Embodiment 1, whereas FIG. 11(b) is a graph that shows the compensatory effect on the charge by the complementary electrode in the configuration of the touch panel 10d shown in FIG. 10 of the present embodiment. Both FIGS. 11(a) and 11(b) show a non-contact state.

Figure 11:
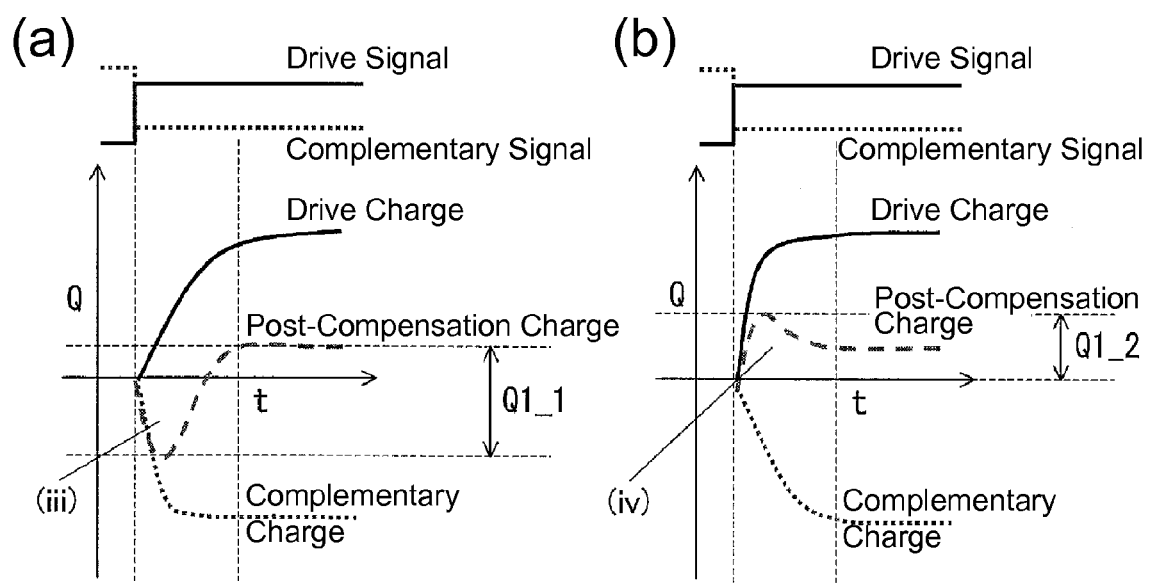
FIG. 11 shows the effect of the complementary electrode of the touch panel shown in FIG. 10.

In FIG. 11, (iii) indicates that the draw-in of the charge is on the complementary signal side, whereas (iv) in FIG. 11 indicates that the draw-in of the charge is on the drive signal side.

When comparing FIGS. 11(a) and 11(b), in FIG. 11(a), which shows Embodiment 1, when comparing the time constant of the detection electrode up to the complementary electrode as seen from the output end to the time constant of the detection electrode up to the driver electrode as seen from the output end, the time constant in the case of the complementary electrode is smaller than in the case of the driver electrode. By contrast, in FIG. 11(b), which shows the present embodiment, when comparing the time constant of the detection electrode up to the complementary electrode as seen from the output end to the time constant of the detection electrode up to the driver electrode as seen from the output end, the time constant in the case of the complementary electrode is larger than in the case of the driver electrode. Thus, in FIG. 11, $Q1\_2$ and $Q1\_1$ satisfy a relation of $$Q1_{-2} < Q1_{-1}.$$

In other words, when taking into consideration the draw-in due to the difference in time constant, it is possible to have further improvement in the ratio of the net signal to total signal in the configuration of the present embodiment than in the configuration of Embodiment 1.

Embodiment 3

Another embodiment according to the present invention is as described below with reference to FIG. 12. In the present embodiment, differences from Embodiment 1 above will be described, and for ease of explanation, components having the same functions as those described in Embodiment 1 are given the same reference characters, and the descriptions thereof are omitted.

The only difference between the touch panel of Embodiment 1 described above and the touch panel of the present embodiment is where the complementary electrodes 4 are disposed. Details thereof will be explained below.

Figure 12:
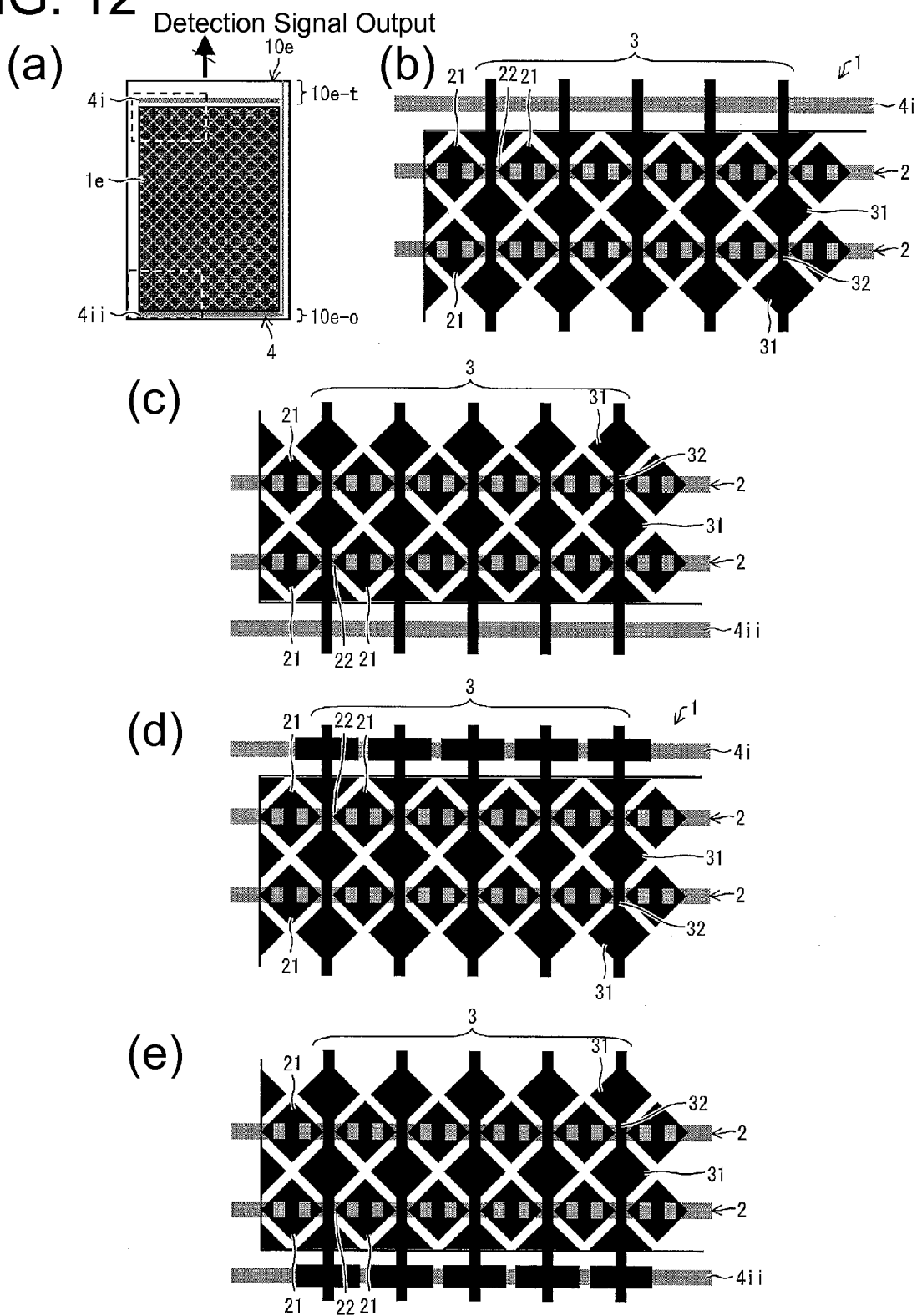
FIG. 12 shows a configuration of a touch panel according to another embodiment of the present invention.

FIG. 12 shows a touch panel 10e of the present embodiment. FIG. 12(a) is a top view of the touch panel corresponding to FIG. 1(a), FIG. 12(b) is a partial magnified view of the touch panel 10e in which a portion in FIG. 12(a) inside a frame is magnified, and FIG. 12(c) is a partial magnified view of the touch panel 10e in which another portion in FIG. 12(a) inside a frame is magnified. FIGS. 12(d) and 12(e) are partial magnified views of the touch panel 10e in a different configuration example corresponding to FIGS. 12(b) and 12(c).

In Embodiment 1 described above, the complementary electrode 4 is provided only in the panel terminal frame region 10a-t outside of the touch panel region. By contrast, in the touch panel 10e of the present embodiment, the complementary electrodes 4 are provided not only in the panel terminal frame region 10e-t (complementary electrode 4i), but also in the opposite region 10e-o, which is outside of the touch panel region 1e and on the side of the touch panel region opposite to the panel terminal frame region 10e-t (complementary electrode 4ii).

The complementary electrode 4ii provided in the opposite region 10e-o intersects with the detection electrodes 3 as in the complementary electrode 4i provided in the panel terminal frame region 10e-t. As shown in FIG. 12, the wiring lines connected to the complementary electrode 4ii provided in the opposite region 10e-o may be provided to the left and/or right of the touch panel region 1e in the touch panel 10e.

The configuration of the present embodiment in which complementary electrodes are provided both in the panel terminal frame region 10e-t and the opposite region 10e-o can be applied in a case in which there is not enough space for a complementary electrode in just one of the regions.

The complementary signal described in Embodiment 1 is simultaneously applied to the complementary electrode 4i and the complementary electrode 4ii.

Embodiment 4

Another embodiment according to the present invention is as described below with reference to FIGS. 13 and 14. In the present embodiment, differences from Embodiment 1 above will be described, and for ease of explanation, components having the same functions as those described in Embodiment 1 are given the same reference characters, and the descriptions thereof are omitted.

The touch panel 10a (FIG. 1) of Embodiment 1 described above is provided with the complementary electrode 4 in the panel terminal frame region 10a-t outside of the touch panel region 1a. By contrast, the touch panel of the present embodiment, as shown with a touch panel 10f-1 in FIG. 13(a), for example, has a complementary electrode 4 provided in the touch panel region 1f-1.

In the present embodiment, as shown in the touch panel 10f-1 of FIG. 13(a), the complementary electrode 4 is provided in a position so as to split the touch panel region 1f-1 in two in the up and down direction on the page. However, the present embodiment is not limited thereto, and may have the configurations respectively shown in FIGS. 13(b) to 13(d).

In a touch panel 10f-2 shown in FIG. 13(b), a touch panel region 1f-2 is split into four regions in the up and down direction on the page, and each region is provided with a complementary electrode 4.

In a touch panel 10f-3 shown in FIG. 13(c), a touch panel region 1f-3 is split into eight regions in the up and down direction on the page, and each region is provided with a complementary electrode 4.

In a touch panel 10f-4 shown in FIG. 13(d), a touch panel region 1f-4 is split into four regions in the up and down direction on the page, and each region is provided with complementary electrodes 4 distributed therein. The touch panel 10f-4 is provided with three complementary electrodes 4 in each region.

The number of regions and the number of complementary electrodes per region are not limited to the description above.

As shown in FIG. 13(a), the complementary electrodes 4 are provided in the touch panel region 1f-1, and thus, compared to Embodiment 1 described above, more localized compensation is possible, and therefore, it is possible to mitigate the effect of change in parasitic capacitance or the time constant due to processes (changes in thickness of the insulating layer through which capacitance is formed or width of the wiring lines). The same is true of the configurations shown in FIGS. 13(b) to 13(d).

In addition, as shown in the respective configurations of FIGS. 13(b) to 13(d), in a configuration in which a complementary electrode is present in each region, the complementary signal described in Embodiment 1 may be simultaneously applied to all complementary electrodes, or the complementary signal may be applied to the complementary electrodes independently.

An advantage of this configuration is localized compensation, as described above, and thus, an effective driving method is to drive only the complementary electrode closest to the driver electrode being driven. For example, when describing the method based on FIG. 13(b), one method is to drive the complementary electrodes sequentially such that if the driver electrodes are sequentially driven one row at a time from top to bottom on the page, then when driving driver electrodes in the top fourth of the touch panel region from the first row, the complementary electrode disposed in that region is driven, and when driver electrodes in the next fourth of the region are driven, then the complementary electrode in that region is similarly driven.

Figure 14:
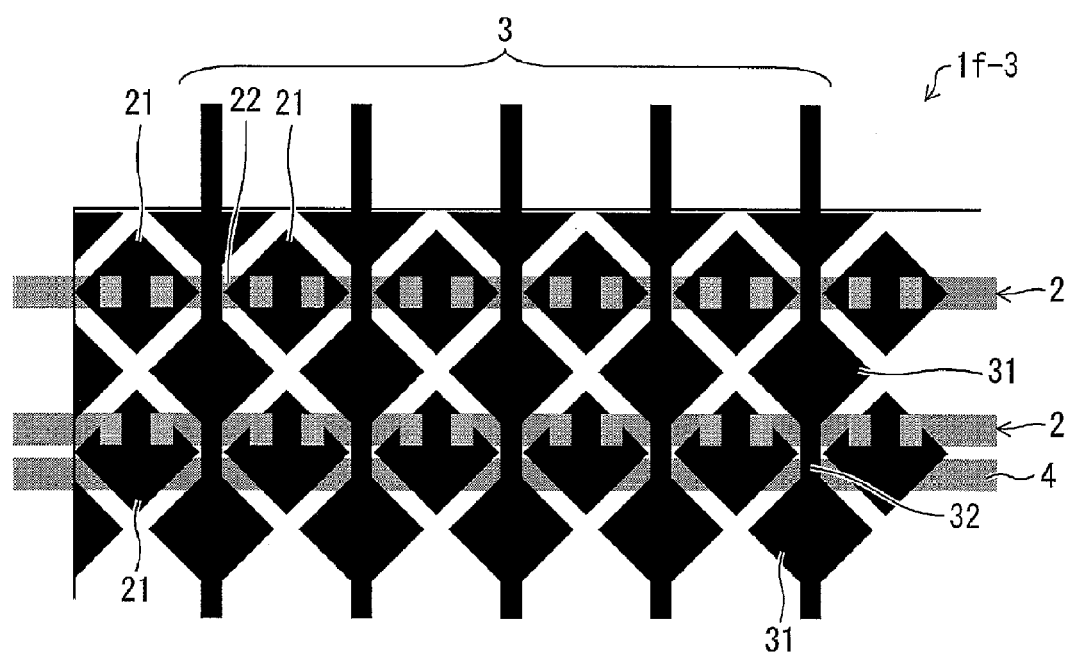
FIG. 14 shows a configuration of a touch panel according to another embodiment of the present invention.

As for where the complementary electrodes are disposed in the touch panel of the present embodiment, FIG. 14 shows one example.

FIG. 14 is a partial magnified view of the touch panel 10f-3 in which the portion of the touch panel in the frame in FIG. 13(c) is magnified. FIG. 14 corresponds to FIG. 1(b).

The touch panel region 1f-3 of FIG. 14 is constituted of driver electrode parts 21, first bridge parts 22, detection electrode parts 31, and second bridge parts 32, and the complementary electrode 4 is disposed parallel to the driver electrode 2 in the second row from the edge, and is in the same layer as the first bridge parts 22.

With this configuration, with the principle described in Embodiment 1, the inactive charge generated based on the drive signal in the capacitance component that does not affect contact detection among the parasitic capacitance formed between the driver electrodes and the detection electrodes can be canceled out with the charge generated based on the complementary signal in the parasitic capacitance formed between the complementary electrode and the detection electrodes. In other words, it is possible to minimize the inactive charge unaffected by the object to be detected.

Embodiment 5

Another embodiment according to the present invention is as described below with reference to FIGS. 15 to 18. In the present embodiment, differences from Embodiment 1 above will be described, and for ease of explanation, components having the same functions as those described in Embodiment 1 are given the same reference characters, and the descriptions thereof are omitted.

Figure 15:
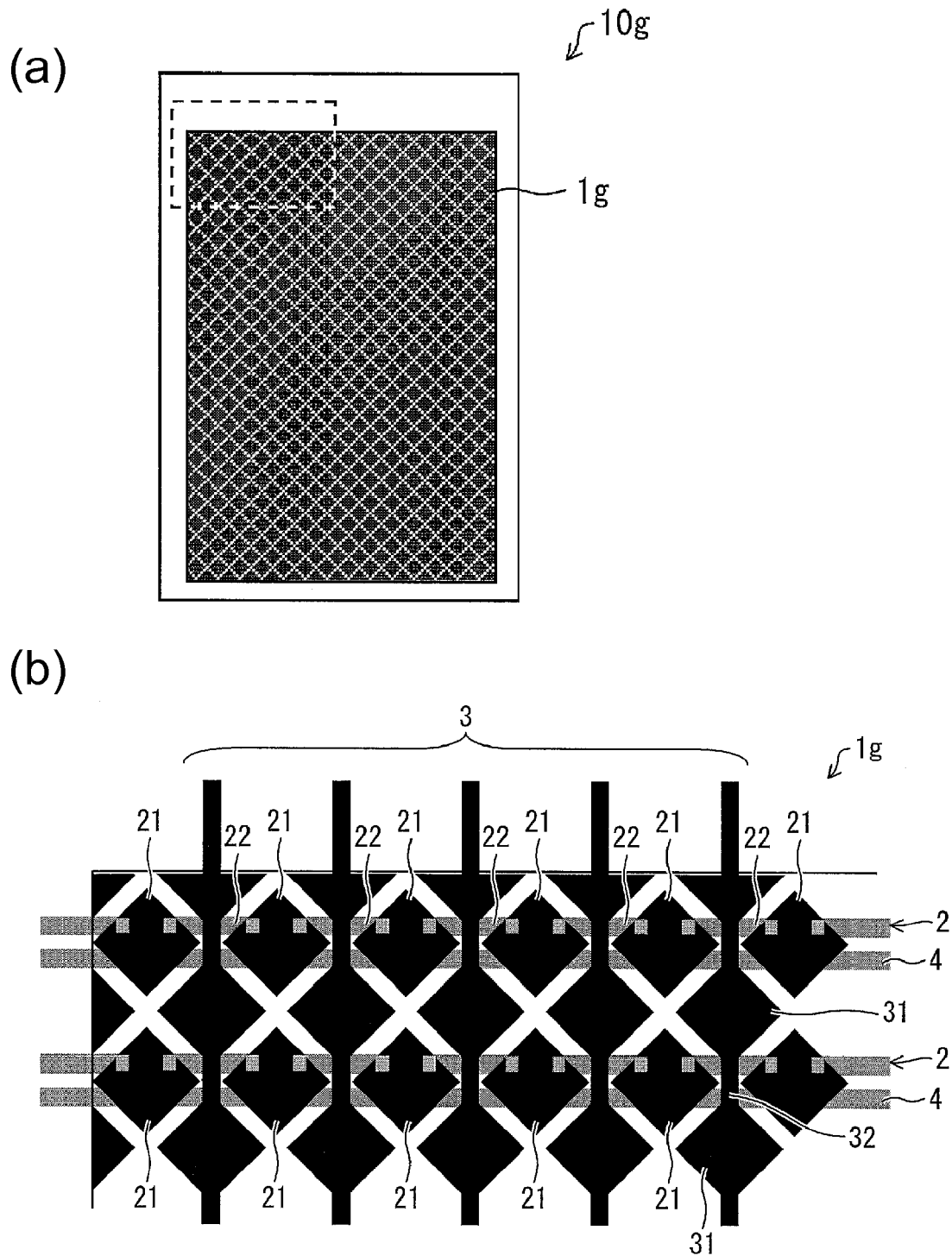
FIG. 15 shows a configuration of a touch panel according to another embodiment of the present invention.

FIG. 15 shows the touch panel of the present embodiment. FIG. 15(a) is a top view of the touch panel, and FIG. 15(b) is a partial magnified view of the touch panel in which the portion in FIG. 15(a) surrounded by the frame is magnified.

The touch panel 10a (FIG. 1) of Embodiment 1 described above is provided with the complementary electrode 4 in the panel terminal frame region 10a-t on the outside of the touch panel region 1a. By contrast, a touch panel 10g of the present embodiment shown in FIG. 15 is provided with complementary electrodes 4 in the touch panel region 1g.

Specifically, the complementary electrodes 4 extend in parallel with the driver electrodes 2 (row direction) along the extension direction of the driver electrodes 2 in the touch panel region 1g shown in FIG. 15(b). The driver electrodes 2 and the complementary electrodes 4 are aligned along the column direction in an alternating fashion. The complementary electrodes 4 are in the same layer as the first bridge parts 22.

Figure 16:
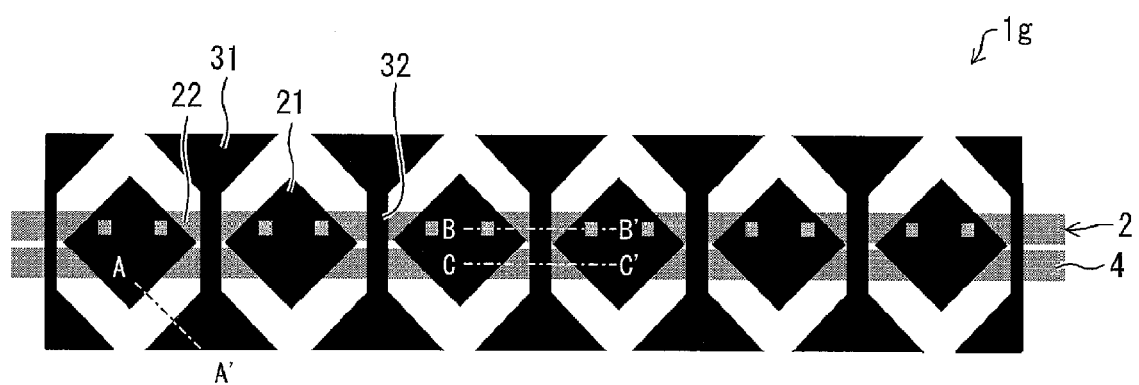
FIG. 16 shows a configuration of a touch panel according to another embodiment of the present invention.

FIG. 16 shows a portion of FIG. 15(b). A detailed configuration of the touch panel region 1g of the touch panel 10g will be described using cross-sectional views of the touch panel 10g along the section line A-A', the section line B-B', and the section line C-C' shown in FIG. 16.

FIG. 17(a) is a cross-sectional view of the touch panel 10g along the section line A-A' shown in FIG. 16. FIG. 17(b) is a cross-sectional view of the touch panel 10g along the section line B-B' shown in FIG. 16. FIG. 17(c) is a cross-sectional view of the touch panel 10g along the section line C-C' shown in FIG. 16.

In the position shown in FIG. 17(a), an insulating film 14 is formed on a substrate 11, and on the insulating film 14, driver electrode parts 21 and detection electrode parts 31 are provided. In this position, a voltage (drive signal) is applied to the driver electrode parts 21, and thus, as shown with the electric force lines in arrows in FIG. 17(a), a parasitic capacitance is formed between the driver electrode parts 21 and the detection electrode parts 31 through the insulating film 14, the substrate 11, and the protective plate 12. With the parasitic capacitance being formed in this manner, as described with FIG. 4 in Embodiment 1, the parasitic capacitance changes as a finger, for example, comes into contact with or approaches a detection surface, and thus, by detecting this change with the detection electrodes 3, it is possible to detect contact or approach to the detection surface.

Parasitic capacitances Cfo, Cfs, Ccr, and Ccm_cr shown in FIG. 17 are the same as those of Embodiment 1 (FIG. 1(d)).

In other words, the configuration is such that when applying the drive signal to the driver electrodes 2, a complementary signal at a different phase from the drive signal is applied to the complementary electrodes 4, and the amplitude (ΔVcm) of the complementary signal satisfies the following formula:

$$\Delta Vcm = -\Delta Vdr \times (Cfo+Ccr)/Ccm$$

Cfo+Ccr in the formula corresponds to Cf−Cfs, and to a capacitance component unnecessary for detection.

The complementary signal is generated by a complementary signal generating circuit, which is not shown in the drawing, included in the touch panel, and a drive signal is inputted to the complementary signal generating circuit. The complementary signal generating circuit reverses the inputted drive signal, thus generating the complementary signal. Thus, an appropriate complementary signal based on the drive signal is generated and applied to the complementary electrodes.

Modification Example

As a modification example of the present embodiment, a configuration shown in FIG. 18 will be described.

Figure 18:
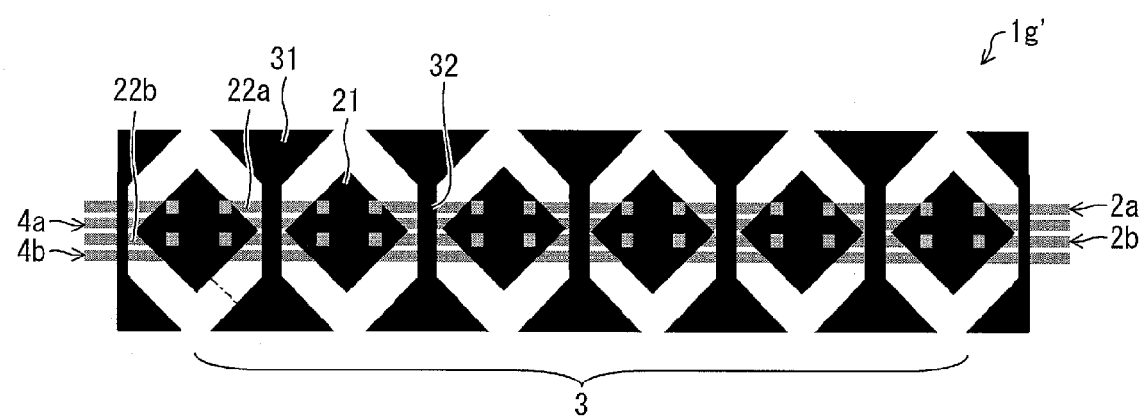
FIG. 18 shows a configuration of a touch panel according to another embodiment of the present invention.

FIG. 18 corresponds to FIG. 16, and is a partial magnified view of a touch panel region 1g' of a touch panel of the present modification example.

As shown in FIG. 18, in the present modification example, in the layer below one driver electrode part 21, two first bridge parts 22a and 22b, and two complementary electrodes 4a and 4b are provided. These are disposed in an alternating fashion in the column direction in the layer below the one driver electrode part 21.

In order to avoid any effects on display quality, it is possible to have a configuration in which one driver electrode or complementary electrode is provided for each display pixel area at a similar pitch to that of the display pixels. In such a case, as in the present modification example, it is possible to drive one driver electrode row using a plurality of thin lines, with the corresponding complementary electrodes nestled therein. This is particularly effective for in-cell touch panels.

Embodiment 6

Another embodiment according to the present invention is as described below with reference to FIG. 19. In the present embodiment, differences from Embodiment 1 above will be described, and for ease of explanation, components having the same functions as those described in Embodiment 1 are given the same reference characters, and the descriptions thereof are omitted.

FIG. 19 shows the touch panel of the present embodiment. FIG. 19(a) is a top view of the touch panel, and FIG. 19(b) is a partial magnified view of the touch panel in which the portion in FIG. 19(a) surrounded by the frame is magnified.

The touch panel 10a of Embodiment 1 described above (FIG. 1) is provided with the complementary electrode 4 in the panel terminal frame region 10a-t outside of the touch panel region 1a. By contrast, a touch panel 10h of the present embodiment shown in FIG. 19 has complementary electrodes 4 provided in the touch panel region 1h.

Specifically, in the touch panel region of the present embodiment, as shown in FIG. 19(b), among driver electrodes 21', first bridge parts 22, detection electrode parts 31, second bridge parts 32, and complementary electrodes 4, only the second bridge parts 32 that connect the detection electrode parts 31 in the column direction are shown in gray. In other words, the driver electrode parts 21, the first bridge parts 22, the detection electrode parts 31, and the complementary electrodes 4 are in the same layer, and are closer to the detection surface than the second bridge part 32.

The first bridge parts 22 that connect the driver electrode parts 21' with each other in the row direction extend along the row direction in the same layer as the driver electrode parts 21' and the detection electrode parts 31. In other words, the detection electrode parts 31 aligned along the column direction are separated by the first bridge parts 22.

The first bridge parts 22 are constituted of a first bridge part 22a and a first bridge part 22b proximal to each other in the column direction. The first bridge part 22a and the first bridge part 22b are disposed between detection electrode parts 31 adjacent to each other in the column direction.

The first bridge part 22a and the first bridge part 22b are disposed between detection electrode parts 31 adjacent to each other in the column direction, and between the first bridge part 22a and the first bridge part 22b, a complementary electrode 4 is formed.

The driver electrode parts 21' differ from those of Embodiment 1 in having a triangular shape. The triangular driver electrode parts 21' are disposed in a substantially triangular space formed by splitting in two in the column direction a substantially quadrilateral space formed in the same layer as quadrilateral detection electrode parts 31 being arranged as in FIG. 19(b), the quadrilateral space being split by the first bridge part 22a and the first bridge part 22b.

As shown in FIG. 19, the second bridge parts 32 are disposed in a layer below the first bridge part 22a, the first bridge part 22b, and the complementary electrode 4, which are between detection electrode parts 31 adjacent to each other in the column direction.

The first bridge part 22a and the first bridge part 22b may be driven separately or driven together.

Embodiment 7

Another embodiment according to the present invention is as described below with reference to FIG. 20. In the present embodiment, differences from Embodiment 1 above will be described, and for ease of explanation, components having the same functions as those described in Embodiment 1 are given the same reference characters, and the descriptions thereof are omitted.

FIG. 20 shows a touch panel 10i of the present embodiment. FIG. 20(a) is a top view of the touch panel 10i corresponding to FIG. 1(a), and FIG. 20(b) is a partial magnified view of a touch panel region 1*i*. FIG. 20(*c*) is a partial magnified view of a different configuration example of the touch panel 10*i* in which the portion in the frame in FIG. 20(*a*) is magnified.

In the touch panel region 1*i* of the present embodiment, as shown in FIGS. 20(*b*) and 20(*c*), driver electrodes 2' extend in the row direction, and complementary electrodes 4 also extend in the row direction. The driver electrodes 2' and the complementary electrodes 4 are disposed in an alternating fashion in the column direction in the same layer.

As shown in FIGS. 20(*b*) and 20(*c*), the detection electrodes 3' extend in the column direction and intersect with the driver electrodes 2' and complementary electrodes 4. As shown in FIGS. 20(*b*) and 20(*c*), only the detection electrodes 3' are black. In other words, the detection electrodes 3' are closer to the detection surface than the driver electrodes 2' and the complementary electrodes 4.

In other words, this is a configuration example of a touch panel in which the driver electrodes 2' and complementary electrodes 4 are in an individual layer different from the individual layer of the detection electrodes 3'. Here, as a method of minimizing the parasitic capacitance Cfs affected by an object to be detected between the complementary electrodes and the detection electrodes, in FIG. 20(*b*), the detection electrodes are made wider on the complementary electrodes such that lines of electric force generated from the lower layer complementary electrodes and coming into the upper layer detection electrodes from outside are mitigated, thereby decreasing the parasitic capacitance Cfs. In FIG. 20(*c*), the driver electrode is made narrower where it overlaps the detection electrodes, thereby decreasing the parasitic capacitance not affected by the object to be detected, and based on this, the parasitic capacitance Cfs between the complementary electrodes and the detection electrodes is decreased by narrowing the complementary electrodes.

Embodiment 8

An embodiment of a display device provided with the above-mentioned touch panel according to the present invention is as described below with reference to FIGS. 21 to 26.

Figure 21:
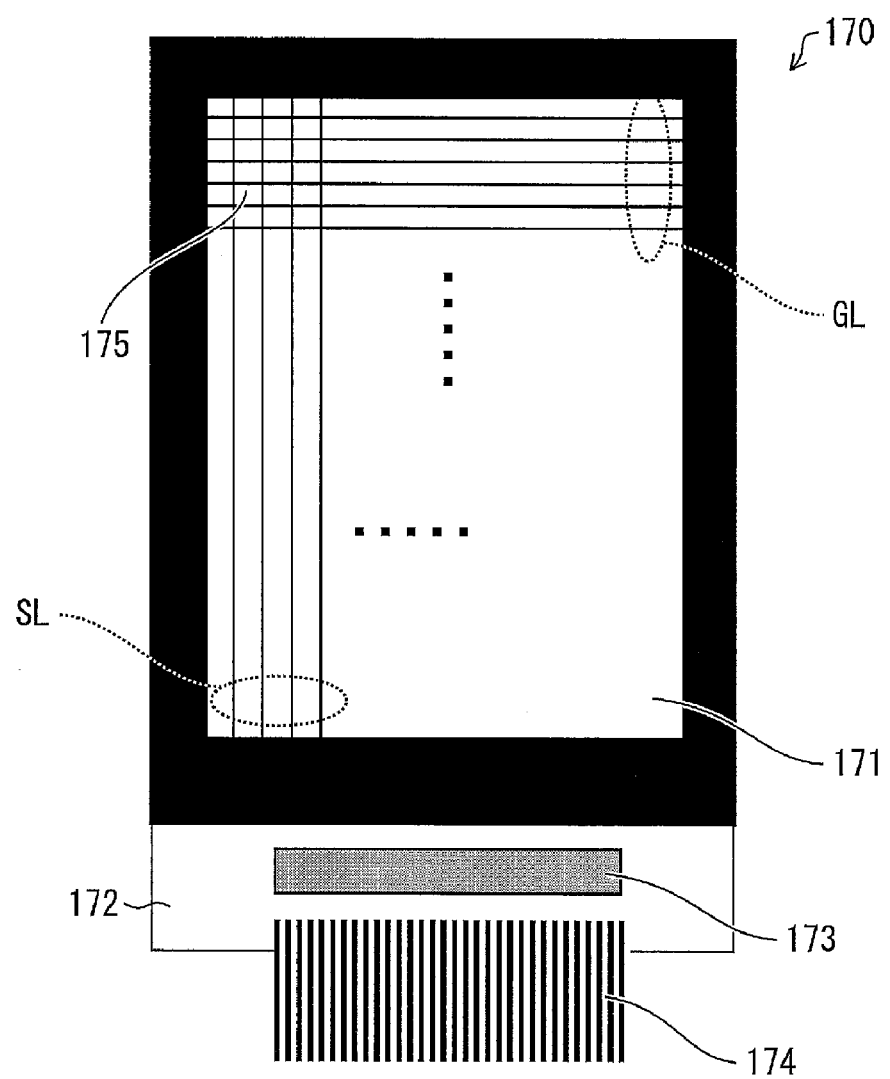
FIG. 21 shows a configuration of a display device according to an embodiment of the present invention.

Here, as an example of a display device, first, a configuration of a general liquid crystal display device will be described with reference to FIG. 21. FIG. 21 is a top view of the liquid crystal display device.

This liquid crystal display device 170 has a configuration in which a plurality of image signal lines SL and a plurality of scanning signal lines GL intersect with each other, and includes a driver 173 in a frame 172 of the liquid crystal display device adjacent to the display region 171, and a flexible substrate 174 provided with wiring lines for connecting to a power source and the like. In the display region 171, pixels 175 are provided at the intersections between the image signal lines SL and the scanning signal lines GL.

Figure 22:
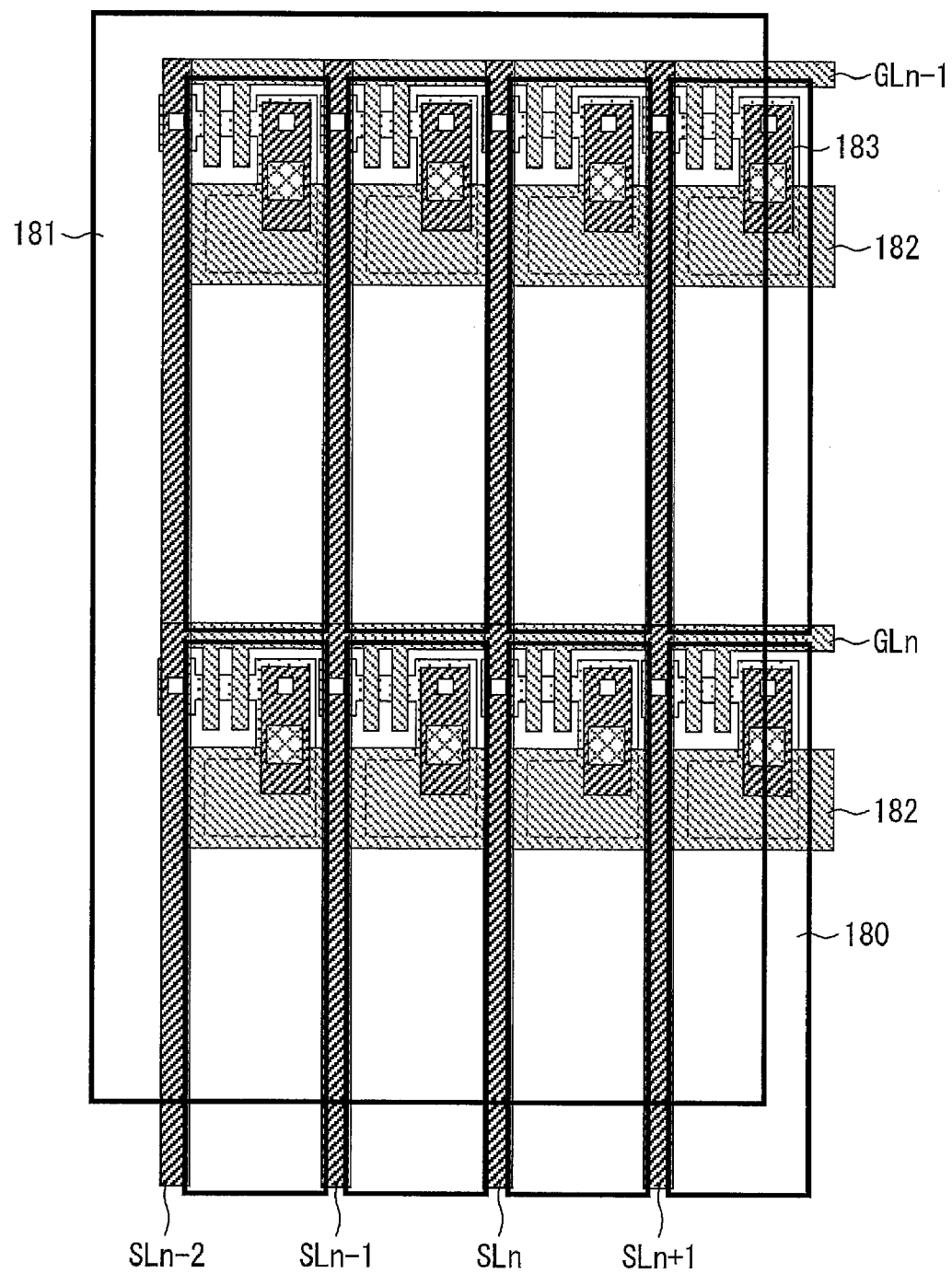
FIG. 22 shows a configuration of pixels in the display device shown in FIG. 21.

Details of the display region 171 will be described with reference to FIG. 22. FIG. 22 is an exploded view of the display region 171. In FIG. 22, pixel areas not covered by a common electrode 181 are present for ease of description, but in reality, all pixel areas are covered by the common electrode 181.

The display region 171 includes pixel electrodes 180 arranged in a matrix, a common electrode 181 disposed opposite to the pixel electrodes 180 with a liquid crystal layer therebetween, auxiliary capacitance wires 182 for forming an auxiliary capacitance Cs between the auxiliary capacitance wires 182 and the pixel electrodes 180, and switching elements 183, which are connected to the image signal lines SL and the scanning signal lines GL and switch on or off the pixel electrodes 180.

Figure 23:
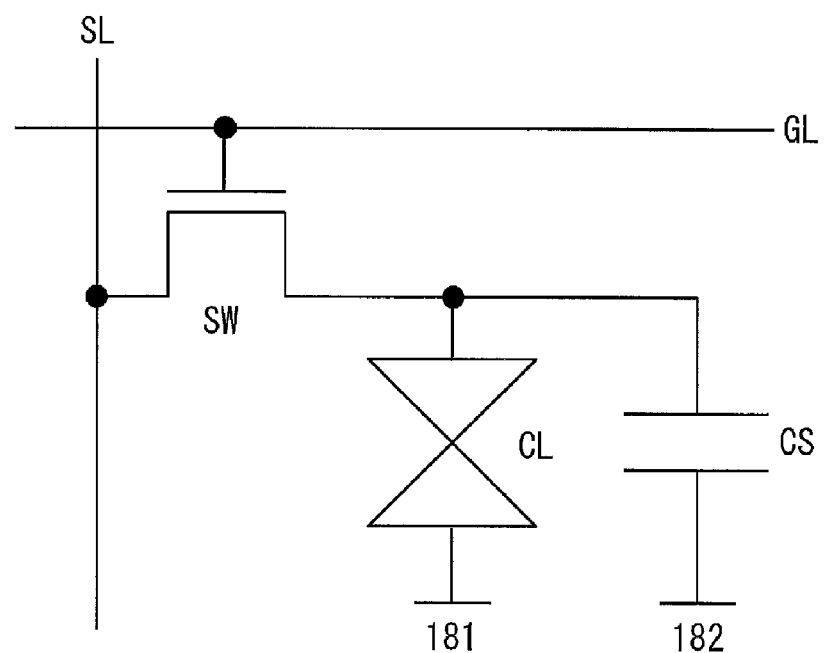
FIG. 23 is a circuit diagram of a partial circuit configuration of the display device shown in FIG. 21.

The liquid crystal display device 170 is an active matrix liquid crystal display device that uses a drive method in which an image signal voltage in which the polarity of a signal voltage is reversed every field period of the display screen is applied to the pixel electrodes 180 during an on period of the switching elements 183, and during an off period of the switching elements 183, a modulation signal is applied in a reverse direction to the auxiliary capacitance wires 182 every field period, which changes the potential of the pixel electrodes 180. The change in potential and the pixel signal voltage are mutually overlapped or canceled, which causes a voltage to be applied to the liquid crystal layer. A circuit configuration of one pixel is shown in FIG. 23.

Figure 24:
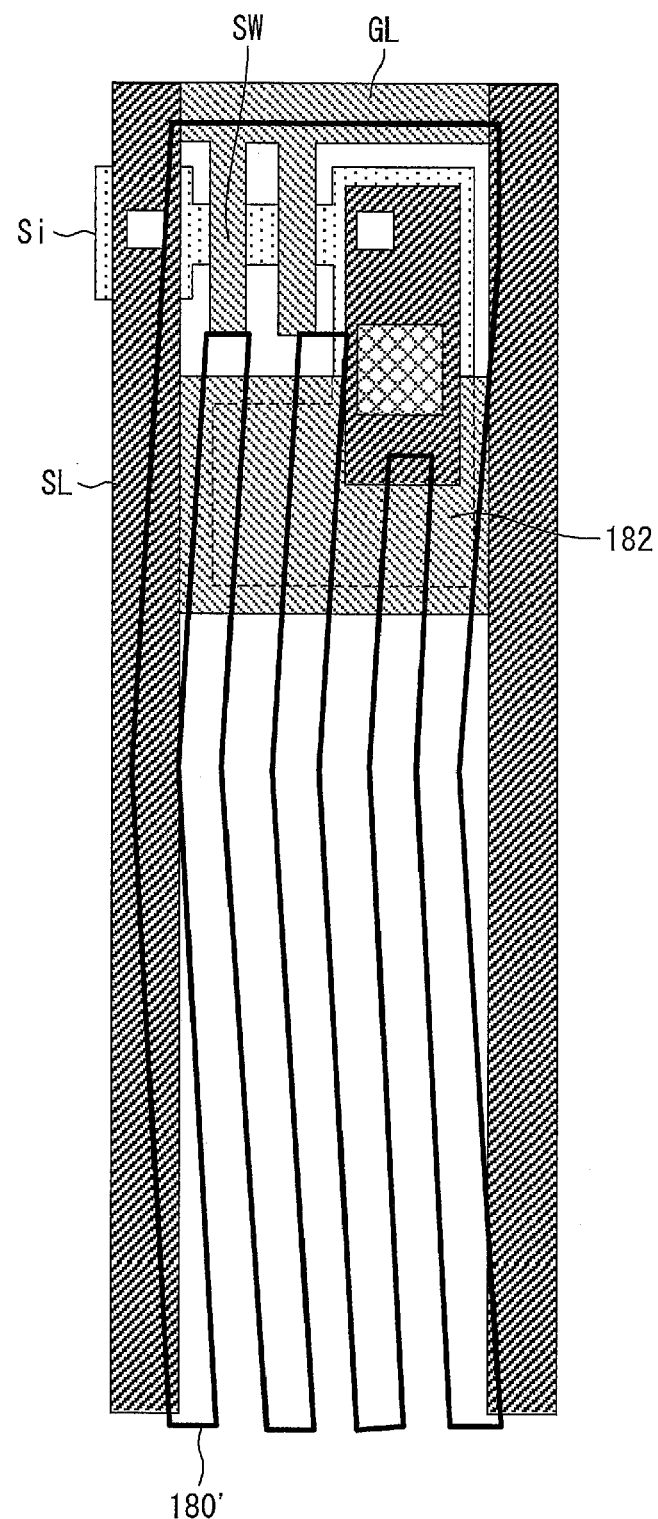
FIG. 24 shows a configuration of a display device according to another embodiment of the present invention.

The pixel configuration is not limited to the description above, and a configuration shown in FIG. 24 in which the pixel electrodes have slits formed along the image signal wiring lines SL may be used. FIG. 24 shows a configuration of one pixel.

In the display device of the present embodiment, a touch panel (function) is installed on the above-mentioned liquid crystal display device.

Specifically, touch panels can be broadly categorized as an on-cell type or an in-cell type. On-cell type is a type in which a touch panel is attached to the surface of a liquid crystal display device such as that mentioned above. In-cell type refers to a type in which a touch panel function is installed in a liquid crystal display device such as that mentioned above, and in which the touch panel uses some of the electrode configuration used in the display device.

Below, first, an on-cell type liquid crystal display device will be described.

Figure 25:
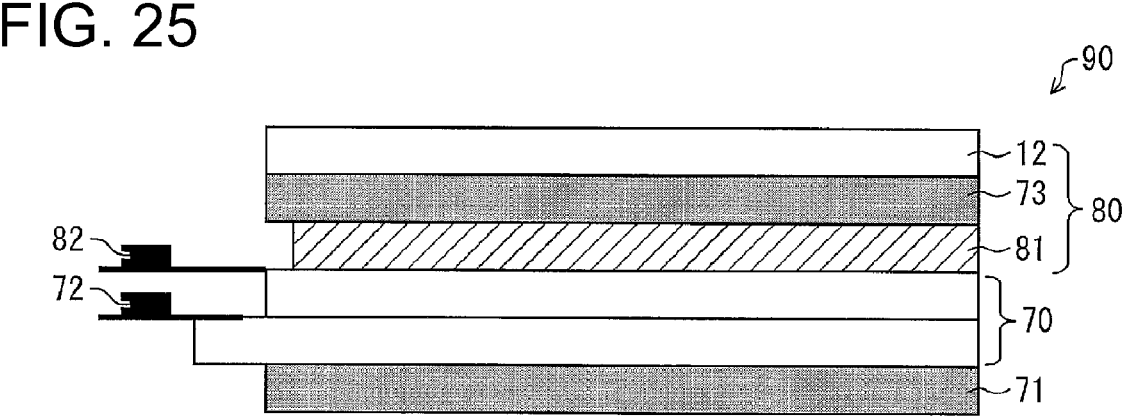
FIG. 25 shows a configuration of a display device according to another embodiment of the present invention.

FIG. 25 is a schematic cross-sectional view of an on-cell type liquid crystal display device 90 of the present embodiment.

The liquid crystal display device 90 shown in FIG. 25 includes a liquid crystal display part 70, and a touch panel part 80 attached to the display surface side of the liquid crystal display part 70.

The liquid crystal display part 70 has a pair of substrates with a liquid crystal layer therebetween, and on the rearmost surface, a first polarizing plate 71 is provided. This liquid crystal display part 70 has the configuration shown in FIG. 21. Therefore, various electrodes shown in FIG. 21 are provided between the pair of substrates shown in FIG. 25. The liquid crystal display part 70 is also provided with a display driver 72 that applies a voltage (signal) to the electrodes.

The touch panel part 80 has the configuration of the touch panel of FIG. 1 already explained in Embodiment 1, but on the display side (light-emitting side) substrate of the pair of substrates in the liquid crystal display part 70, various electrodes 81 (driver electrodes, detection electrodes, and complementary electrodes) shown in FIGS. 1 and 3 are formed.

The touch panel part 80 is provided with a second polarizing plate 73 between the protective plate 12 and the various electrodes 81. The touch panel part 80 is also provided with a detection driver 82 that applies a voltage (signal) to the various electrodes 81.

In this manner, an on-cell type liquid crystal display device 90 of the present embodiment can detect that an object to be detected is in contact with or approaching a detection surface (surface of the protective plate 12) in the touch panel part 80 in a state in which images are displayed in the liquid crystal display part 70.

The above-mentioned on-cell type liquid crystal display device is one example and the present invention is not limited thereto; various types of on cell-type liquid crystal display devices can be used.

The present invention is not limited to a configuration in which various electrodes of the touch panel are formed on the substrate of the liquid crystal display part, and a configuration may be used in which the second polarizing plate is provided on the liquid crystal display part, and on the second polarizing plate, everything from the substrate 11 to the protective plate 12 shown in FIG. 3 is attached. However, in order to allow a thinner configuration, a configuration may be used in which the substrate 11 is omitted and the various electrodes are formed on the second polarizing plate.

Next, an in-cell type liquid crystal display device will be described.

Figure 26:
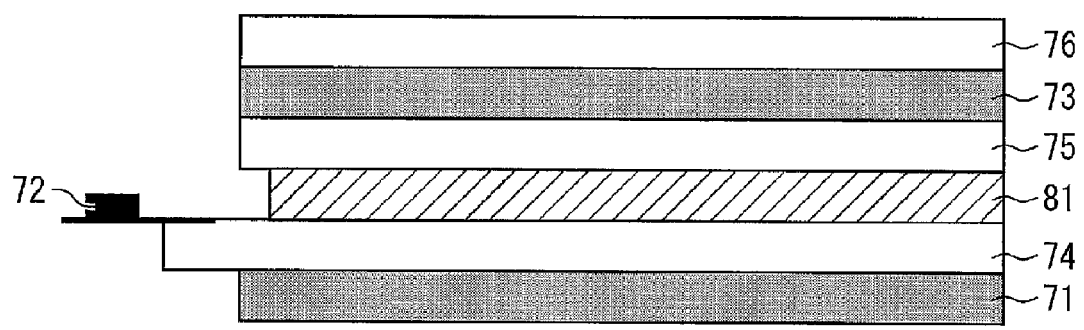
FIG. 26 shows a configuration of a display device according to another embodiment of the present invention.

FIG. 26 is a cross-sectional view that shows a schematic configuration of an in-cell type liquid crystal display device. In FIG. 26, various electrodes 81 of the touch panel are formed between the first substrate 74 and the second substrate 75, which constitute the pair of substrates of the liquid crystal display.

As an example of a configuration of FIG. 26, the driver electrodes and the detection electrodes are in the same layer and are disposed on the liquid crystal layer side of the first substrate 74 of the liquid crystal display, for example.

The in-cell type liquid crystal display device is not limited to the configuration of FIG. 26.

Below, a driving method will be described for an in-cell type, in which the common electrode for display is shared with the touch panel driver electrodes and the detection electrodes.

Figure 27:
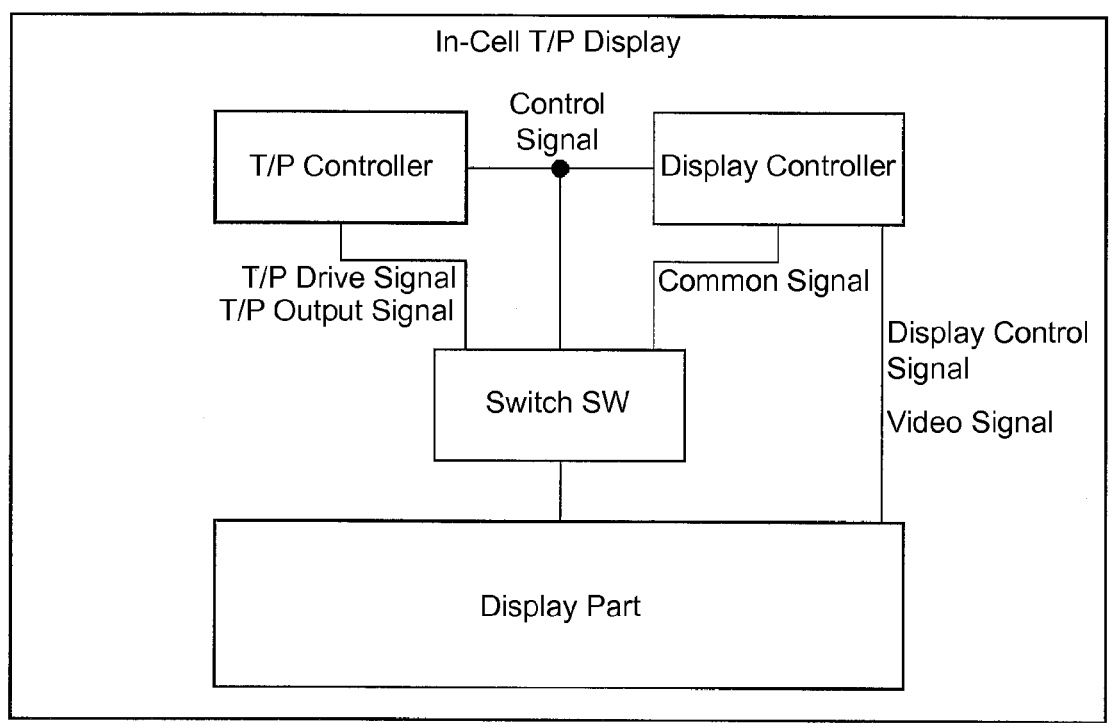
FIG. 27 is a drawing for explaining how a display device including a touch panel according to the present invention is driven.

FIG. 27 shows a schematic view of an in-cell touch panel (T/P) display. The common electrode for display is shared with the T/P driver electrodes and the T/P detection electrodes, and thus, a switch for supplying to the common electrode for display any of the common signal, the T/P driving signal, and the T/P detection signal (detection signal is extracted) is included.

Figure 28:
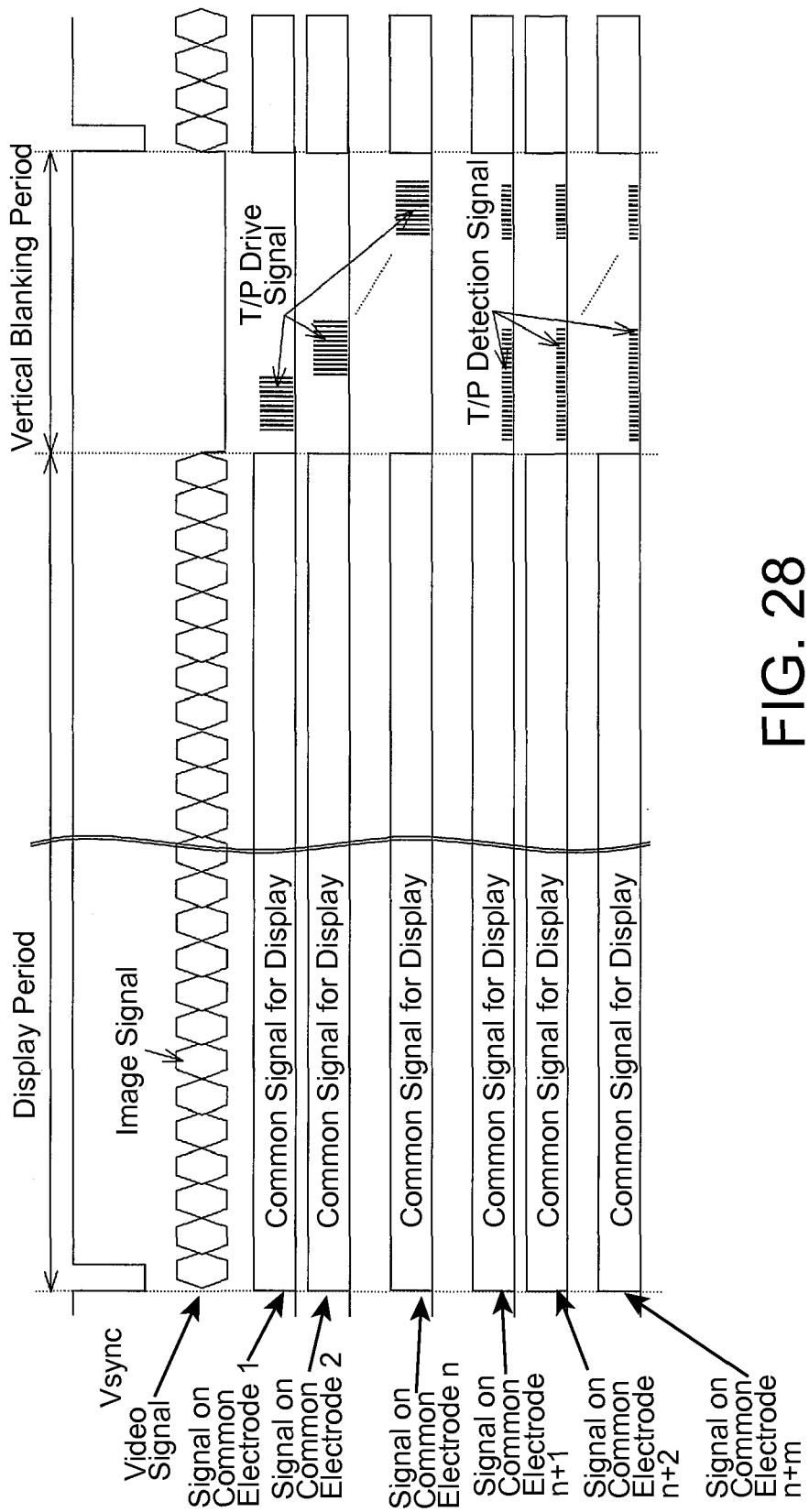
FIG. 28 is a drawing for explaining how a display device including a touch panel according to the present invention is driven.

FIG. 28 shows a schematic drive timing chart, and by using the above-mentioned switch, during a display period, a common signal is inputted to the display part common electrode and normal display is performed, and during a vertical blanking period, the T/P drive signal is supplied to the display part common electrode, and the T/P detection signal is extracted. In FIG. 28, an example is shown in which the common electrode for display is divided into n+m blocks, where blocks 1 to n are for when the common electrode functions as a driver electrode, and blocks n+1 to n+m are for when the common electrode functions as a detection electrode.

The display device according to the present embodiment can be applied as a display device with a touch sensor integrally incorporated therein. Besides this, the display device is suitable to various electronic devices that include touch sensor functionality. This display device can also be applied to personal computers and various portable devices such as mobile phones and laptop computers.

Embodiment 9

As another embodiment of the present invention of a display device including the above-mentioned touch panel, an in-cell type liquid crystal display device will be described with reference to FIGS. 29 and 30.

FIG. 29 shows an in-cell type touch sensor-integrated liquid crystal display device of the present embodiment. FIG. 29(a) is a top view of the touch sensor-integrated liquid crystal display device, and FIG. 29(b) is a partial magnified view of the touch sensor-integrated liquid crystal display device in which a portion of FIG. 29(a) within the frame is magnified. FIG. 30 shows a situation in which a common electrode 181 is on the topmost surface for ease of description.

Figure 30:
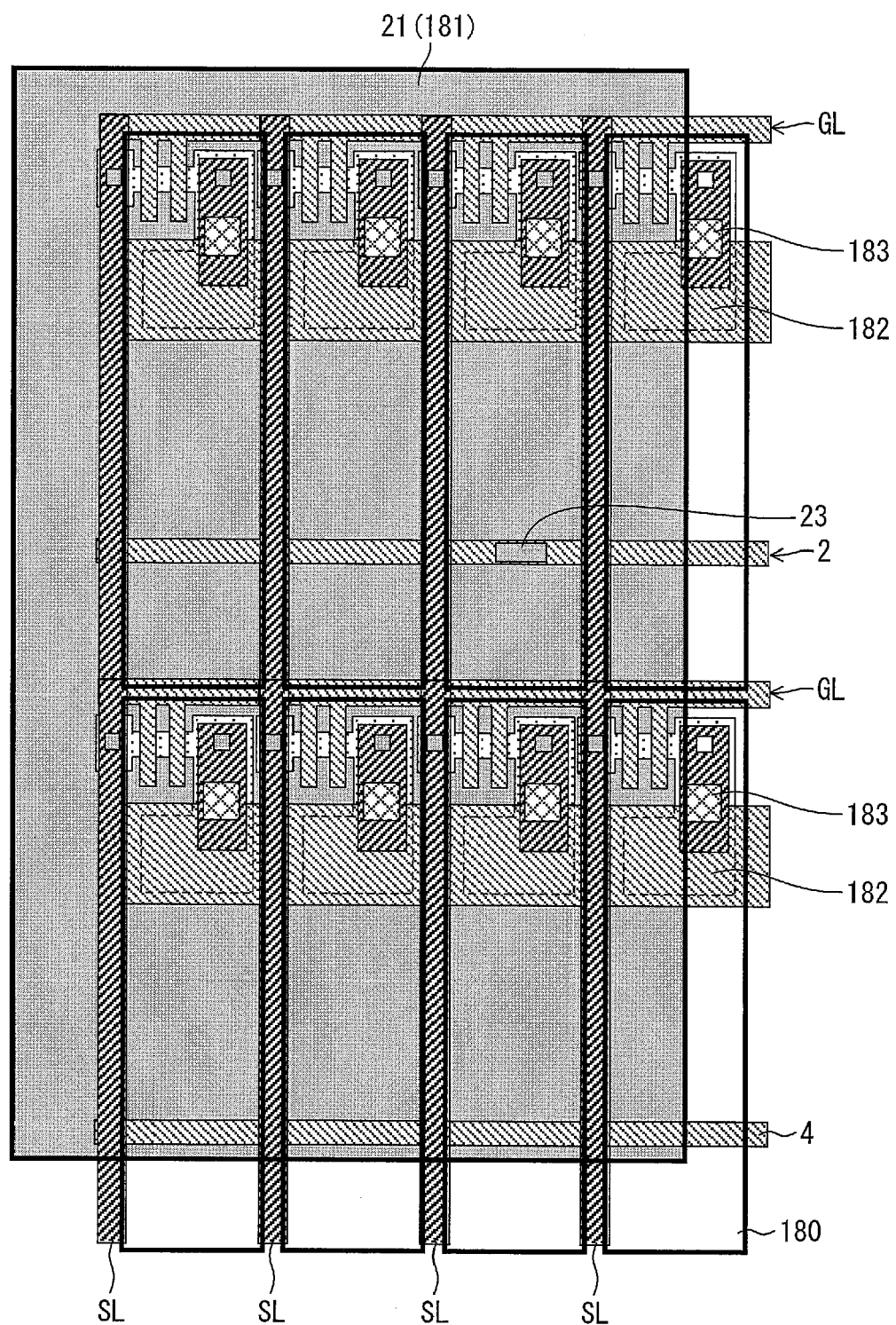
FIG. 30 shows a configuration of pixels in the display device shown in FIG. 29.
Figure 31:
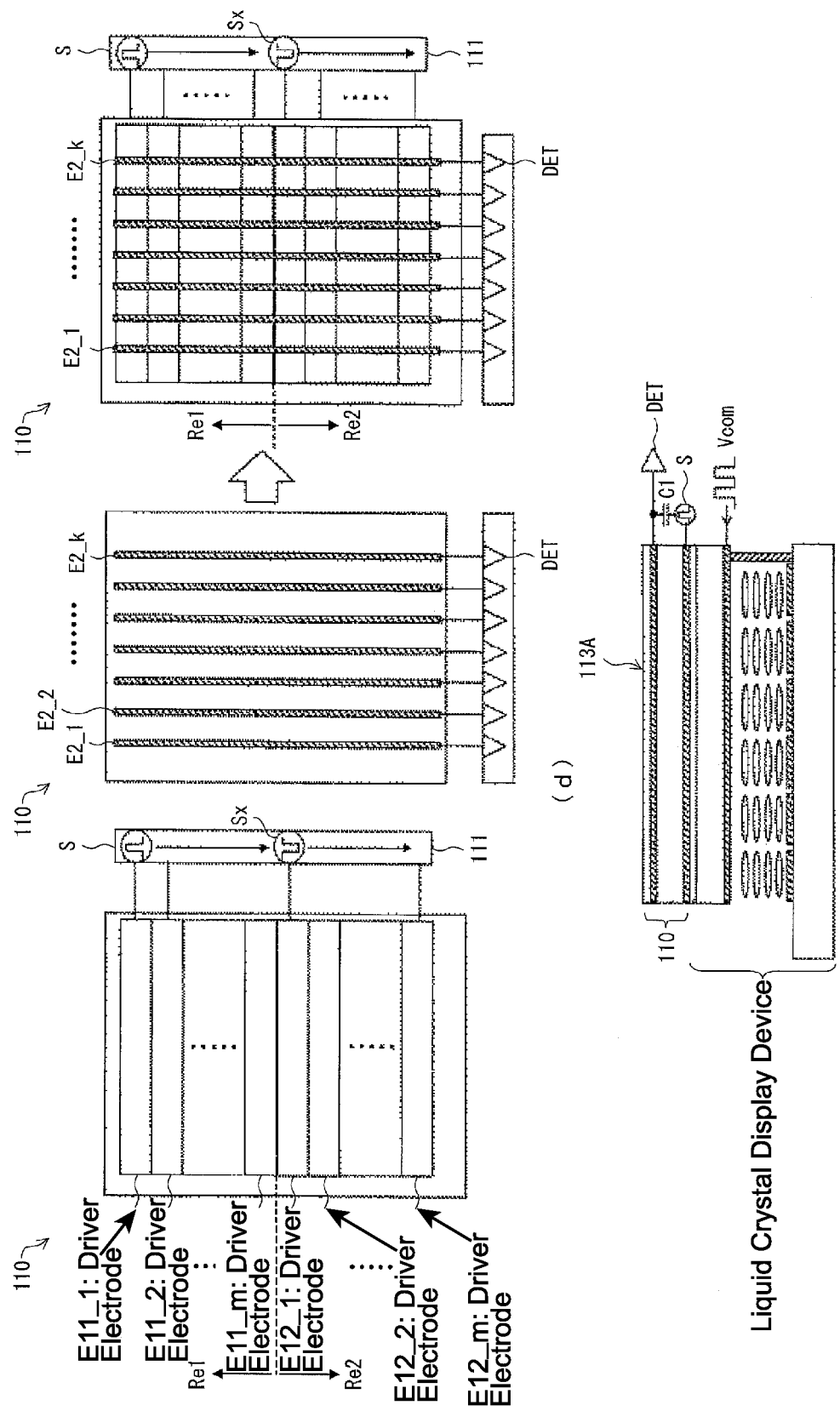
FIG. 31 is a drawing showing a conventional technology.
Figure 32:
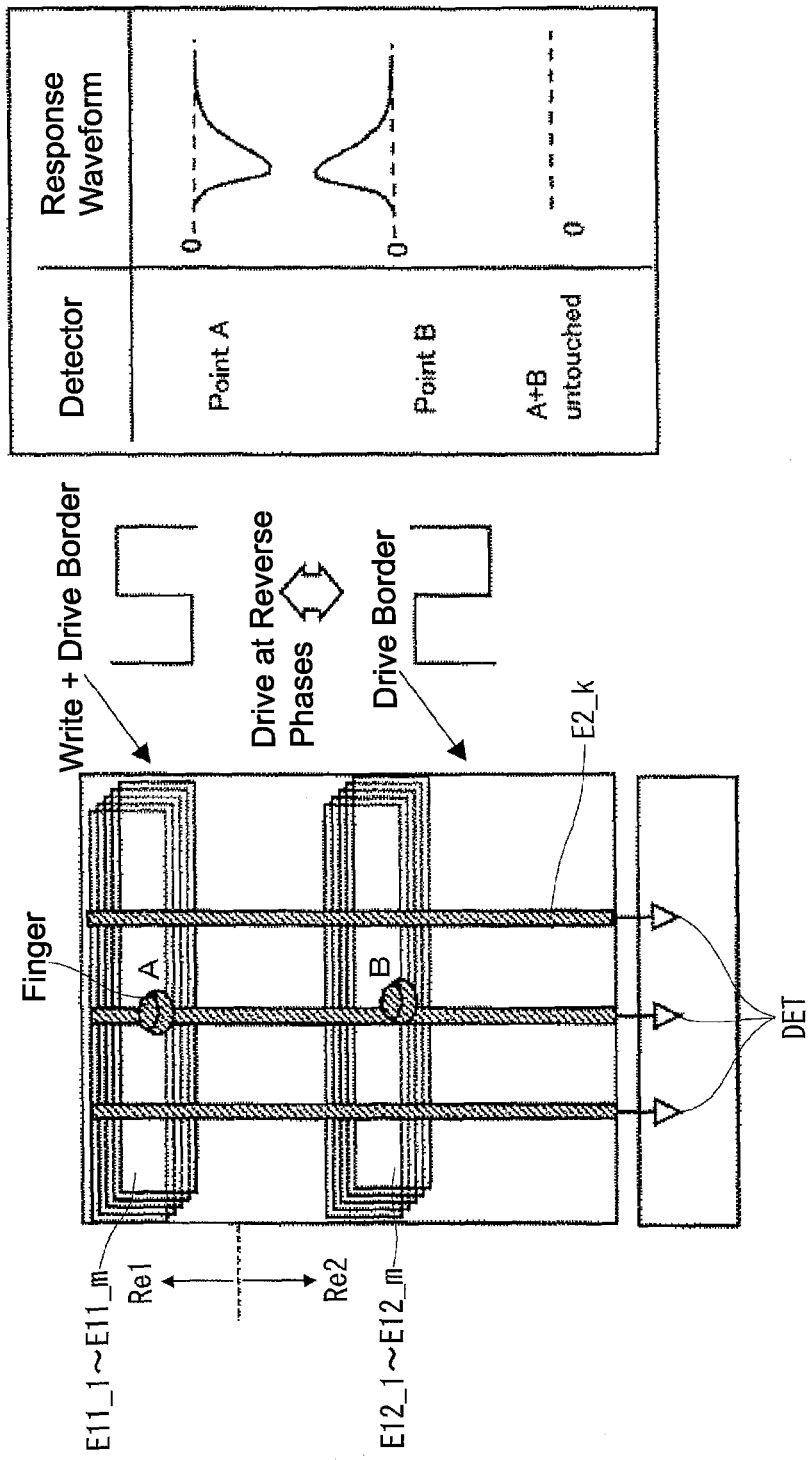
FIG. 32 is a drawing showing a conventional technology.

The liquid crystal display device of the present embodiment shown in FIG. 30 has a configuration in which a plurality of image signal lines SL extending in the column direction and a plurality of scanning signal lines GL extending in the row direction intersect. The liquid crystal display device includes pixel electrodes 180 arranged in a matrix, a common electrode 181 that forms capacitance with the pixel electrodes 180 through a liquid crystal layer (not shown), auxiliary capacitance wires 182 that form an auxiliary capacitance Cs between the auxiliary capacitance wires 182 and the pixel electrodes 180, and switching elements 183, which are connected to the image signal lines SL and the scanning signal lines GL and switch the pixel electrodes 180 on and off (see FIG. 24 for details).

In FIG. 29(b), the driver electrode parts 21, the detection electrode parts 31, and the second bridge parts 32 are in the same layer, and have a similar configuration to Embodiment 5 (FIG. 15) described above. In other words, the driver electrode parts 21, the detection electrode parts 31, and the second bridge parts 32 are in the same layer. Also, the driver electrode parts 21, the detection electrode parts 31, and the second bridge parts 32 double as the common electrode 181, and are made of patterned transparent electrodes.

In the region of the driver electrode parts 21, contact parts 23 between the driver electrode parts 21 (common electrode 181) and the first bridge parts are provided.

The complementary electrodes 4 and the driver electrodes 2, which extend in the row direction, are arranged in an alternating fashion in the column direction.

Wiring lines extending in the row direction where the contact parts 23 are not formed are connected to a fixed voltage source (GND, for example) 190.

A liquid crystal display device configured in this matter may use only the necessary area and not the whole region for detecting an object to be detected. With this configuration, it is possible to ensure display quality.

The present invention is not limited to the embodiments above. Various modifications can be made to the present invention by those skilled in the art without departing from the scope specified by claims. That is, new embodiments can be obtained by combining technologies that were appropriately modified in the scope specified by claims. In other words, the specific embodiments provided in the detailed description of the present invention section are merely for illustration of the technical contents of the present invention. The present invention shall not be narrowly interpreted by being limited to such specific examples. Various changes can be made within the spirit of the present invention and the scope as defined by the appended claims.

SUMMARY OF INVENTION

As stated above, a touch panel according to the present invention is a touch panel, having a touch panel region including a plurality of driver electrodes that extend in a row direction and a plurality of detection electrodes that extend in a column direction, the touch panel detecting that an object has come into contact with or approached a detection surface on the basis of a change in an amount of electric charge induced on the detection electrodes when a drive signal is applied to each of the driver electrodes, in which a complementary electrode is disposed so as to extend along a direction in which the driver electrodes extend in the touch panel region or a region that is adjacent thereto, the complementary electrode forming along with the detection electrodes a capacitance substantially corresponding to a capacitance component that is not affected by a presence or absence of the object among capacitances formed between the driver electrodes and the detection electrodes, and in which a complementary signal has a reverse phase in relation to the drive signal being applied to the complementary electrode when the drive signal is applied to each of the driver electrodes.

According to the configuration above, by providing a complementary electrode, it is possible to form between the complementary electrode and the detection electrode a parasitic capacitance corresponding to capacitance component that does not affect detection, among the parasitic capacitance formed between the driver electrode and the detection electrode. Also, a complementary signal that has a reverse phase compared to the drive signal is applied to the complementary electrode.

As a result, the inactive charge generated as a result of the drive signal at a capacitance component that does not affect detection among the parasitic capacitance formed between the driver electrodes and the detection electrodes can be canceled out by charge generated as a result of the complementary signal at the parasitic capacitance formed between the complementary electrode and the detection electrodes. In other words, it is possible to minimize the inactive charge that is not affected by the object to be detected.

Also, even if objects to be detected are in contact with (approach) the detection surface on the same line, the electrical changes do not cancel each other out unlike the conventional configuration. Thus, glitches such as non-detection do not occur.

Therefore, according to the configuration of the present invention, it is possible to provide a highly reliable touch panel in which glitches such as non-detection do not occur.

In addition to the configuration above, in the touch panel of the present invention it is preferable that the touch panel have a terminal frame region where respective terminals of the driver electrodes, the detection electrodes, and the complementary electrode are disposed on one end adjacent to the touch panel region, and that the complementary electrode be present the terminal frame region.

According to this configuration, the complementary electrode is provided outside of the touch panel region.

With this configuration, it is possible to prevent the formation of regions where the touch function is inactive compared to a case in which the complementary electrode is formed in the touch panel region.

Also, compared to a case in which the complementary electrode is formed in the touch panel region, it is possible to prevent a decrease in plane resolution.

Furthermore, compared to a case in which the complementary electrode is formed in the touch panel region, there is more design flexibility in the shape of the complementary electrode, and a more efficient attainment of compensatory effects can be anticipated.

According to the configuration above, of the frame region, which is peripheral to the touch panel region, only the terminal frame region is used, and thus, it is possible to narrow the frame in other regions of the frame region.

Also, if this touch panel is installed in a display device, the complementary electrode is disposed outside of the touch panel region as described above, and thus, it is possible to prevent the complementary electrode from being seen.

In addition to the configuration above, in the touch panel of the present invention it is preferable that the touch panel have a terminal frame region where respective terminals of the driver electrodes, the detection electrodes, and the complementary electrode are disposed on one end adjacent to the touch panel region, and that the complementary electrode be present in a region opposite to the terminal frame region across the touch panel region.

As stated above, by taking into consideration the draw-in resulting from differences in time lag by providing a complementary electrode in an opposite region located opposite to the terminal frame region across the touch panel region, it is possible to improve the proportion of active signals when detecting an object to be detected among the total detection signal, compared to a configuration in which the complementary electrode is provided in the terminal frame region.

However, the above-mentioned configuration may be modified such that a plurality of the complementary electrodes are provided, the touch panel has a terminal frame region where respective terminals of the driver electrodes, the detection electrodes, and the plurality of complementary electrodes are disposed on one end adjacent to the touch panel region, and the plurality of complementary electrodes are present in the terminal frame region and a region opposite to the terminal frame region across the touch panel.

In addition to the configuration above, in the touch panel of the present invention it is preferable that a plurality of the complementary electrodes be provided in the touch panel region.

According to the configuration above, by providing the complementary electrodes in the touch panel region, compared to a case in which the complementary electrode is provided in the adjacent region, it is possible to have localized compensation, and thus, it is possible to mitigate the effect of parasitic capacitance change due to processes (change in the thickness of the insulating layer through which capacitance is formed or the wiring line width) or the time constant.

In addition to the configuration above, in the touch panel of the present invention it is preferable that the driver electrodes include a plurality of driver electrode parts interconnected by first bridge parts, that the detection electrodes include a plurality of detection electrode parts interconnected by second bridge parts, that the driver electrode parts and the detection electrode parts be in the same layer as each other, that the second bridge parts be in the same layer as the driver electrode parts and the detection electrode parts, that the first bridge parts be in a layer different from the layer, and that the complementary electrode be in the same layer as the first bridge parts.

According to this configuration, it is possible to effectively mitigate parasitic capacitance that does not affect detection of an object to be detected.

In addition to the configuration above, in the touch panel of the present invention it is preferable that the driver electrodes include a plurality of driver electrode parts interconnected by first bridge parts, that the detection electrodes include a plurality of detection electrode parts interconnected by second bridge parts, that the driver electrode parts, the first bridge parts, and the detection electrode parts be in the same layer, the second bridge parts being in a layer different from the driver electrode parts and the detection electrode parts, the complementary electrodes being in the same layer as the first bridge parts at a portion of the complementary electrodes overlapping the detection electrodes, that the detection electrode parts be arranged parallel to each other along the column direction, that the driver electrode parts be between detection electrode parts adjacent to each other in the row direction, and that the complementary electrodes extend between driver electrodes adjacent to each other in the column direction.

In the configuration above, even if it is necessary to form the complementary electrodes in the same layer as the driver electrode parts and the detection electrode parts, it is possible to avoid having the complementary electrodes and the detection electrodes be adjacent to each other, and thus, it is possible to minimize the capacitance component formed between the adjacent electrodes that is affected by an object to be detected (corresponding to Cfs in FIGS. 4(b) and 17(a)).

In addition to the configuration above, in the touch panel of the present invention it is preferable that, in intersections between the detection electrodes and the complementary electrode, whichever of the electrodes disposed closer to the detection surface be wide in the direction in which the other electrode disposed in a layer therebelow extends.

According to this configuration, among the capacitance formed between the driver electrodes and the detection electrodes, the capacitance component affected by the object to be detected is the portion indicated as Cfs in FIG. 3(a), or in other words, the component resulting from lines of electric force moving towards the detection electrodes, which are in a layer above the driver electrodes, from the outside lower layer. Even in the case of a complementary electrode also formed in the lower layer, if the detection electrodes in the layer thereabove have the same shape as on the driver electrodes, then similar lines of electric force result, which causes a parasitic capacitance affected by the object to be detected to be present (corresponding to Ccm_fs in FIG. 3(c)). Here, if the width of the driver electrodes and the complementary electrode differs, then the value of Cfs changes proportionally, and thus, making the complementary electrode sufficiently narrow is one method of decreasing the parasitic capacitance component affected by the object to be detected (corresponding to FIGS. 1(b) and 8(b)). A method to further improve this is shown in FIGS. 1(c) and 20(b) in which the detection electrodes are made wider on the complementary electrodes, and block lines of electric force entering from the outside lower layer, thereby minimizing the capacitance component between the complementary electrodes and the detection electrodes affected by the object to be detected.

The present invention also includes a display device provided with the above-mentioned touch panel.

INDUSTRIAL APPLICABILITY

The present invention can be applied to a display device of various types of electronic devices as a display device that includes a liquid crystal panel that has both a display function and a touch panel function.

DESCRIPTION OF REFERENCE CHARACTERS 1a, 1c, 1d, 1e, 1f-1 to 1f-4, 1g, 1h, 1i touch panel region
2 driver electrode
3 detection electrode
4, 4a, 4b, 4i, 4ii complementary electrode
10a, 10b, 10c, 10d, 10f-1 to 10f-4, 10g, 10h, 10i touch panel
10a-t, 10d-t panel terminal frame region (adjacent region)
10d-o opposite region
11 substrate
12 protective plate
13 shield
14 insulating film
21 driver electrode part
22, 22a, 22b first bridge part
23 contact part
31 detection electrode part
32 second bridge part
50 intersection
60 intersection
70 liquid crystal display part
71 first polarizing plate
72 display driver
73 second polarizing plate
74 first substrate
75 second substrate
80 touch panel part
81 electrodes (driver electrodes, detection electrodes, and complementary electrode)
82 detection driver
90, 90' liquid crystal display device (display device)
170 liquid crystal display device
171 display region
172 frame part
173 driver
174 flexible substrate
175 pixel
180, 180' pixel electrode
181 common electrode
182 auxiliary capacitance wiring line
183 switching element
190 fixed voltage source

The invention claimed is:

1. A touch panel having a touch panel region including a plurality of driver electrodes that extend in a row direction and a plurality of detection electrodes that extend in a column direction, the touch panel detecting that an object has come into contact with or approached a detection surface on the basis of a change in an amount of electrical charge induced on the detection electrodes when a drive signal is applied to each of the driver electrodes, wherein a complementary electrode is disposed so as to extend along a direction in which the driver electrodes extend in the touch panel region or a region that is adjacent thereto, the complementary electrode forming along with the detection electrodes a capacitance substantially corresponding to a capacitance component that is not affected by a presence or absence of said object among capacitances formed between the driver electrodes and the detection electrodes, wherein, when the drive signal is applied to each of the driver electrodes, a complementary signal having a reverse phase in relation to the drive signal is applied to the complementary electrode, wherein the driver electrodes include a plurality of driver electrode parts interconnected by first bridge parts, wherein the detection electrodes include a plurality of detection electrode parts interconnected by second bridge parts, wherein the driver electrode parts and the detection electrode parts are in the same layer as each other, wherein the second bridge parts are in the same layer as the driver electrode parts and the detection electrode parts, and the first bridge parts are in a layer different from said layer, and wherein the complementary electrode is in the same layer as the first bridge parts.

2. The touch panel according to claim 1,
wherein the touch panel has a terminal frame region on one end thereof adjacent to the touch panel region, the terminal frame region having respective terminals for the driver electrodes, the detection electrodes and the complementary electrode, and
wherein the complementary electrode is disposed in a region opposite to the terminal frame region across the touch panel region.

3. The touch panel according to claim 1,
wherein a plurality of said complementary electrodes are provided,
wherein the touch panel has a terminal frame region on one end thereof adjacent to the touch panel region, the terminal frame region having respective terminals for the driver electrodes, the detection electrodes, and the complementary electrodes, and
wherein one or more of the plurality of complementary electrodes are disposed in the terminal frame region and the remaining one more of the plurality of complementary electrodes are disposed in a region opposite to the terminal frame region across the touch panel.

4. The touch panel according to claim 1, wherein a plurality of said complementary electrodes are provided in the touch panel region.

5. The touch panel according to claim 1,
wherein the touch panel has a terminal frame region on one end thereof adjacent to the touch panel region, the terminal frame region having respective terminals for the driver electrodes, the detection electrodes and the complementary electrode, and
wherein the complementary electrode is disposed in the terminal frame region.

6. A touch panel, having a touch panel region including a plurality of driver electrodes that extend in a row direction and a plurality of detection electrodes that extend in a column direction, the touch panel detecting that an object has come into contact with or approached a detection surface on the basis of a change in an amount of electrical charge induced on the detection electrodes when a drive signal is applied to each of the driver electrodes,
wherein a complementary electrode is disposed so as to extend along a direction in which the driver electrodes extend in the touch panel region or a region that is adjacent thereto, the complementary electrode forming along with the detection electrodes a capacitance substantially corresponding to a capacitance component that is not affected by a presence or absence of said object among capacitances formed between the driver electrodes and the detection electrodes,
wherein, when the drive signal is applied to each of the driver electrodes, a complementary signal having a reverse phase in relation to the drive signal is applied to the complementary electrode,
wherein a plurality of said complementary electrodes are provided in the touch panel region,
wherein the driver electrodes include a plurality of driver electrode parts interconnected by first bridge parts,
wherein the detection electrodes include a plurality of detection electrode parts interconnected by second bridge parts,
wherein the driver electrode parts, the first bridge parts, and the detection electrode parts are in the same layer, the second bridge parts being in a layer different from the driver electrode parts and the detection electrode parts,
the complementary electrodes being in the same layer as the first bridge parts at a portion of the complementary electrodes overlapping the detection electrodes,
wherein the detection electrode parts are arranged parallel to each other along the column direction,
wherein the driver electrode parts are positioned between detection electrodes adjacent to each other in the row direction, and
wherein the complementary electrodes extend between driver electrodes adjacent to each other in the column direction.

7. A touch panel, having a touch panel region including a plurality of driver electrodes that extend in a row direction and a plurality of detection electrodes that extend in a column direction, the touch panel detecting that an object has come into contact with or approached a detection surface on the basis of a change in an amount of electrical charge induced on the detection electrodes when a drive signal is applied to each of the driver electrodes,
wherein a complementary electrode is disposed so as to extend along a direction in which the driver electrodes extend in the touch panel region or a region that is adjacent thereto, the complementary electrode forming along with the detection electrodes a capacitance substantially corresponding to a capacitance component that is not affected by a presence or absence of said object among capacitances formed between the driver electrodes and the detection electrodes,
wherein, when the drive signal is applied to each of the driver electrodes, a complementary signal having a reverse phase in relation to the drive signal is applied to the complementary electrode, and
wherein, in each of intersections between the detection electrodes and the complementary electrode, one of the complementary electrode and the detection electrode that is disposed closer to the detection surface has an enlarged width relative to portions of said one of the complementary electrode and the detection electrode immediately adjacent thereto.

8. A display device, comprising the touch panel according to claim 1.

9. A display device, comprising the touch panel according to claim 6.

10. A display device, comprising the touch panel according to claim 7.

11. The touch panel according to claim 7,
wherein the touch panel has a terminal frame region on one end thereof adjacent to the touch panel region, the terminal frame region having respective terminals for the driver electrodes, the detection electrodes and the complementary electrode, and
wherein the complementary electrode is disposed in the terminal frame region.

12. The touch panel according to claim 7,
wherein the touch panel has a terminal frame region on one end thereof adjacent to the touch panel region, the terminal frame region having respective terminals for the driver electrodes, the detection electrodes and the complementary electrode, and
wherein the complementary electrode is disposed in a region opposite to the terminal frame region across the touch panel region.

13. The touch panel according to claim 7,
wherein a plurality of said complementary electrodes are provided,
wherein the touch panel has a terminal frame region on one end thereof adjacent to the touch panel region, the terminal frame region having respective terminals for the driver electrodes, the detection electrodes, and the complementary electrodes, and wherein one or more of the plurality of complementary electrodes are disposed in the terminal frame region and the remaining one more of the plurality of complementary electrodes are disposed in a region opposite to the terminal frame region across the touch panel.

14. The touch panel according to claim 7, wherein a plurality of said complementary electrodes are provided in the touch panel region.

* * * * *